United States Patent
Rich et al.

(10) Patent No.: US 7,429,437 B2
(45) Date of Patent: Sep. 30, 2008

(54) DIFFRACTIVE OPTICAL ELEMENT AND METHOD OF MANUFACTURE

(75) Inventors: Chris Rich, San Pedro, CA (US); Joel Petersen, Valley Village, CA (US)

(73) Assignee: Wavefront Technology, Inc., Paramount, CA (US)

(*) Notice: Subject to any disclaimer, the term of this patent is extended or adjusted under 35 U.S.C. 154(b) by 0 days.

(21) Appl. No.: 11/343,576

(22) Filed: Jan. 31, 2006

(65) Prior Publication Data

US 2006/0121358 A1 Jun. 8, 2006

Related U.S. Application Data

(62) Division of application No. 10/036,198, filed on Dec. 28, 2001, now Pat. No. 6,998,196.

(51) Int. Cl.
*G03H 1/04* (2006.01)

(52) U.S. Cl. .................... 430/1; 430/2; 430/20; 359/3; 359/7

(58) Field of Classification Search ................. None
See application file for complete search history.

(56) References Cited

U.S. PATENT DOCUMENTS

| | | |
|---|---|---|
| 3,459,839 A | 8/1969 | Hutfles |
| 3,565,978 A | 2/1971 | Folger et al. |
| 3,658,526 A | 4/1972 | Haugh |
| 3,850,633 A | 11/1974 | Moraw et al. |
| 4,420,502 A | 12/1983 | Conley |
| 4,478,769 A | 10/1984 | Pricone et al. |
| 4,486,363 A | 12/1984 | Pricone et al. |
| 4,575,192 A | 3/1986 | Duthie et al. |

(Continued)

FOREIGN PATENT DOCUMENTS

EP 753801 * 1/1997

(Continued)

OTHER PUBLICATIONS

Caulfield et al. "The Applications of Holography" (1971) pp. 1-31 and 66-69.

(Continued)

*Primary Examiner*—Martin J Angebranndt
(74) *Attorney, Agent, or Firm*—Knobbe, Martens, Olson & Bear, LLP

(57) ABSTRACT

A diffractive optical element such as a diffuser, diffraction grating, and/or hologram, can be manufactured by using a surface relief pattern on a surface of a surface relief tool. A layer of curable material is physically contacted with the surface relief pattern on the surface of the surface relief tool to thereby imprint the pattern on a surface of the layer. Diffractive features are formed in the layer by propagating energy through the surface relief tool and into the layer such that refractive index variations corresponding to the pattern are created in the layer. The resultant product is a diffractive optical element comprising a layer of material having diffractive features formed by a predetermined pattern of refractive index variations. The diffractive features originate at an undulating boundary and extend only from one side of the boundary into the material. The undulating boundary has an undulating pattern that corresponds to the predetermined pattern of refractive index variations.

36 Claims, 19 Drawing Sheets

U.S. PATENT DOCUMENTS

| | | | |
|---|---|---|---|
| 4,588,664 A * | 5/1986 | Fielding et al. | 430/1 |
| 4,657,780 A | 4/1987 | Pettigrew et al. | |
| 4,758,296 A | 7/1988 | McGrew | |
| 4,806,442 A | 2/1989 | Shirasaki et al. | |
| 4,836,874 A | 6/1989 | Foster | |
| 4,840,757 A | 6/1989 | Blenkhorn | |
| 4,856,857 A | 8/1989 | Takeuchi et al. | |
| 4,904,033 A | 2/1990 | Ikeda et al. | |
| 4,942,102 A | 7/1990 | Keys et al. | |
| 4,942,112 A * | 7/1990 | Monroe et al. | 430/282.1 |
| 4,959,283 A * | 9/1990 | Smothers et al. | 430/1 |
| 5,198,912 A | 3/1993 | Ingwall et al. | |
| 5,243,449 A * | 9/1993 | Smith | 359/13 |
| 5,279,689 A | 1/1994 | Shvartsman | |
| 5,315,417 A | 5/1994 | Moss et al. | |
| 5,340,637 A | 8/1994 | Okai et al. | |
| 5,576,853 A | 11/1996 | Molteni et al. | |
| 5,606,433 A * | 2/1997 | Yin et al. | 359/1 |
| 5,615,022 A * | 3/1997 | Brandstetter et al. | 359/12 |
| 5,658,719 A | 8/1997 | Sawyer | |
| 5,705,096 A | 1/1998 | Kano et al. | |
| 5,721,630 A | 2/1998 | Horner et al. | |
| 5,798,850 A * | 8/1998 | Ishikawa et al. | 359/12 |
| 5,838,466 A | 11/1998 | Mallik | |
| 5,942,157 A | 8/1999 | Sutherland et al. | |
| 6,087,075 A | 7/2000 | Kler et al. | |
| 6,120,701 A * | 9/2000 | Hsu | 252/299.01 |
| 6,147,726 A | 11/2000 | Kubota et al. | |
| 6,421,109 B1 * | 7/2002 | Popovich | 349/202 |
| 6,998,196 B2 * | 2/2006 | Rich et al. | 430/1 |
| 6,999,649 B1 * | 2/2006 | Chen et al. | 385/18 |
| 7,060,200 B1 * | 6/2006 | Farrand et al. | 252/299.01 |

FOREIGN PATENT DOCUMENTS

| | | |
|---|---|---|
| WO | WO 88/04796 | 6/1988 |
| WO | WO 01/90822 | 11/2001 |

OTHER PUBLICATIONS

*Liquid Crystals in Complex Geometries Formed by polymer and porous networks*, Taylor & Francis Ltd., London, 1996, pp. 8, 18, 53, 56, 57, 108, 212, 214, 218, and 246-253.

*Handbook of Liquid Crystal Research*, Oxford University Press, Inc., New York, 1997, pp. 353-354.

*Liquid Crystals Applications and Uses*, World Scientific, Singapore, vol. 3, 1992, pp. 2-7, 20-25, 44-55.

R. L. Sutherland et al., Bragg Gratings in an Acrylate Polymer Consisting of Periodic Polymer-Dispersed Liquid-Crystal Planes, *Chem. Mater.*, vol. 5, 1993, pp. 1533-1538.

* cited by examiner

ND METHOD OF MANUFACTURE

DIFFRACTIVE OPTICAL ELEMENT AND METHOD OF MANUFACTURE

PRIORITY INFORMATION

This application is a divisional application of U.S. patent application Ser. No. 10/036,198, filed Dec. 28, 2001, now U.S. Pat. No. 6,998,196, the entire contents of which are hereby incorporated by reference herein.

BACKGROUND OF THE INVENTION

1. Field of the Invention

This application relates to a method of forming diffractive features in a layer of material and more particularly to the formation of diffractive optical elements (DOEs), such as for example diffraction gratings, diffusers, volume holograms, and holographic optical elements, which employ such diffractive features.

2. Description of the Related Art

In recent years, applications for diffractive optical elements and holograms has increased. DOEs and holograms are used for decoration and signs, as illustrations in publications such as magazines, to provide protection against tampering or counterfeiting as well as for beam shaping; the later being the function of holographic optical elements. Holograms, and more generally DOEs comprise a plurality of diffractive features arranged such that an input light beam directed onto the DOE or hologram is transformed by diffraction into an output beam forming a predefined image or having a particular shape. For reflective structures, the output beam corresponds to the reflection of the input beam; similarly for a transmissive structures, the output is produced by transmitting the input beam through the hologram or DOE. In either case, the input beam is diffracted to form the output beam.

Of significant importance, is the efficiency of the diffractive optical element or hologram, that is the intensity of the output beam in comparison to the input beam from which it originates. Efficient DOEs produce brighter output beams for a given intensity input. Related to efficiency is the angular selectivity. For some holograms, for example, a single output beam results. Other holograms however produce a number of output beams each directed at a different angle with respect to the input beam. For holograms employed for image formation, proper viewing involves looking at the hologram from a location so as to receive the output beam at the eye. Accordingly, in holograms that are highly angularly selective, an image can only be viewed from a particular narrow range of angles. An additional consideration, the ease of fabricating and thus the cost of the hologram, often determines whether a hologram is practical for a particular application. How a hologram is produced, and the effort that is involved, depends on the type of hologram. Surface holograms include a surface having a predetermined undulating topography defining features that diffracts light in an intended way. Manufacture of the surface hologram involves formation of this patterned surface, which can be accomplished by pressing a surface relief master tool into a soft film to produce the appropriate topographic relief pattern on the surface of the hologram. This process, conventionally referred to as embossing, is relatively simple and inexpensive compared to the manufacturing process involved in creating volume holograms. Volume holograms comprise a layer of material having a predetermined pattern of refractive index variations defining diffractive features within the medium that diffract an incoming beam in a desired manner. Recording of volume holograms conventionally involves exposing a photosensitive material to a laser beam; such arrangements, however, are particularly sensitive to vibration and air currents as well as fluctuations in temperature. Although volume holograms are more difficult to fabricate than surface holograms, they have a higher optical efficiency, i.e., increased wavelength selectivity, and thus are often more desirable than surface holograms.

What is needed is diffractive optical elements and holograms that provide high optical efficiency and that are easy to manufacture.

SUMMARY OF THE INVENTION

One aspect of the invention comprises a method of using a medium having a surface relief pattern on a surface thereof to manufacture a diffractive optical element. The method comprises physically contacting a layer of curable material with the surface relief pattern on the surface of the medium to thereby imprint the pattern on a surface of the layer and curing the curable material. The curing comprises forming diffractive features comprising refractive index variations in the layer that correspond to the pattern. The forming comprising propagating energy through the medium and from the medium into the layer.

Another aspect of the invention comprises a method of manufacturing of using first and second media having first and second surface relief patterns on respective surfaces thereof to manufacture a diffractive optical element. In this method, a layer of curable material is physically contacted with the first surface relief pattern on the surface of the first medium to thereby imprint the first pattern on a surface of the layer and the curable material is cured. The curing comprises forming diffractive features comprising refractive index variations in the layer that correspond to the first pattern on the first medium. The forming comprises propagating energy through the first medium and from the first medium into the layer. The method further comprises physically contacting the layer of curable material with the surface relief features on the surface of the second medium to thereby imprint the second pattern on another surface of the layer such that two surface relief patterns on opposite sides of the layer surround the index of refraction variations.

Yet another aspect of the invention comprises a method of using a medium having a surface relief pattern on a surface thereof to manufacture a volume hologram. The method comprises physically contacting a layer of curable material with the surface relief pattern on the surface of the medium to thereby imprint the pattern on a surface of the layer. Diffractive features are formed in the layer by propagating energy through the medium and from the medium into the layer such that refractive index variations corresponding to the pattern are created in the layer.

Still another aspect of the invention comprises a method of using surface relief features on a surface of a medium to manufacture a volume hologram. In this method the surface relief features on the surface of the medium are physically contacted with a surface of a layer of curable material. A pattern of diffractive features are formed in the layer by propagating electromagnetic energy through the surface relief features of the medium and from the medium into the layer. The formation of the pattern of diffractive features is dependent on the surface relief features, and substantially independent of any diffraction of the energy by the surface relief features during propagation through the medium.

Another aspect of the invention comprises a method of utilizing a medium having a surface relief pattern on a surface thereof to manufacture an optical element having a multiplicity of diffractive features. The method comprises physically contacting the surface relief pattern with a layer of curable material such that the pattern and the layer are in contact over a contact area of the layer. The diffractive features are formed in the layer by illuminating the contact area with light having an intensity distribution substantially free of interference fringes.

In still another aspect of the invention, a diffractive optical element includes a sheet comprised of a material having diffractive features formed by a predetermined- pattern of refractive index variations. The diffractive features originate at an undulating boundary and extend only from one side of the boundary into the material. The undulating boundary has an undulating pattern that corresponds to the predetermined pattern of refractive index variations.

In yet another aspect of the invention, a diffractive optical element comprises a layer of material having diffractive features formed by a predetermined pattern of refractive index variations and a surface relief pattern formed on the layer. The surface relief pattern corresponds to the predetermined pattern of refractive index variations.

Another aspect of the invention comprises a diffractive optical element formed by the following method of physically contacting a layer of curable material is with a surface relief pattern on a surface of a medium to thereby imprint the pattern on a surface of the layer and forming diffractive features in the layer by propagating energy through the medium and from the medium into the layer such that refractive index variations corresponding to the pattern are created in the layer.

Another aspect of the invention comprises a method of manufacturing a diffractive optical element using a first medium having a first surface relief pattern on a surface thereof and a second medium having a second surface relief pattern on a surface thereof. In this method, one side of a layer of curable material is physically contacted with the first surface relief pattern on the surface of the medium to thereby imprint the pattern on the side of the layer. Another side of a layer of curable material is physically contacted with the second surface relief pattern on the surface of the medium to thereby imprint the pattern on the another side of the layer. The curable material is cured, the curing comprising forming diffractive features comprising refractive index variations in the layer that correspond to the pattern. The forming comprises propagating energy through the first medium and from the first medium into the layer.

Still another aspect of the invention comprises a diffractive optical element comprising a sheet comprising substantially optically transmissive material and having surface relief patterns on opposite sides. The sheet has an index variation within the substantially optically transmissive material. The index variations coinciding with at least one of the surface relief patterns.

DETAILED DESCRIPTION OF THE PREFERRED EMBODIMENT

This application relates to diffractive optical elements, components comprising diffractive features that are arranged so as to diffract an incident light beam transforming it into a desired predetermined image and/or beam shape. Examples of such diffractive optical elements include structures having at least partially randomly distributed diffractive features such as diffusers as well as structures having diffractive features at least partially arranged in a periodic fashion such as, for example, diffraction gratings, holograms, and holographic optical elements (HOEs). Computer generated holograms (CGHs) as well as lithographically rendered diffractive optical elements are among the various types of diffractive optical elements. These examples, however, are not to be construed as limiting. For example, descriptions of holograms and methods of their manufacture set forth below may pertain also to other types of diffractive optical elements, including, for example, diffraction gratings and diffusers, as well as others, and thus such descriptions should not be interpreted as being limited solely to holograms.

Figure 1:
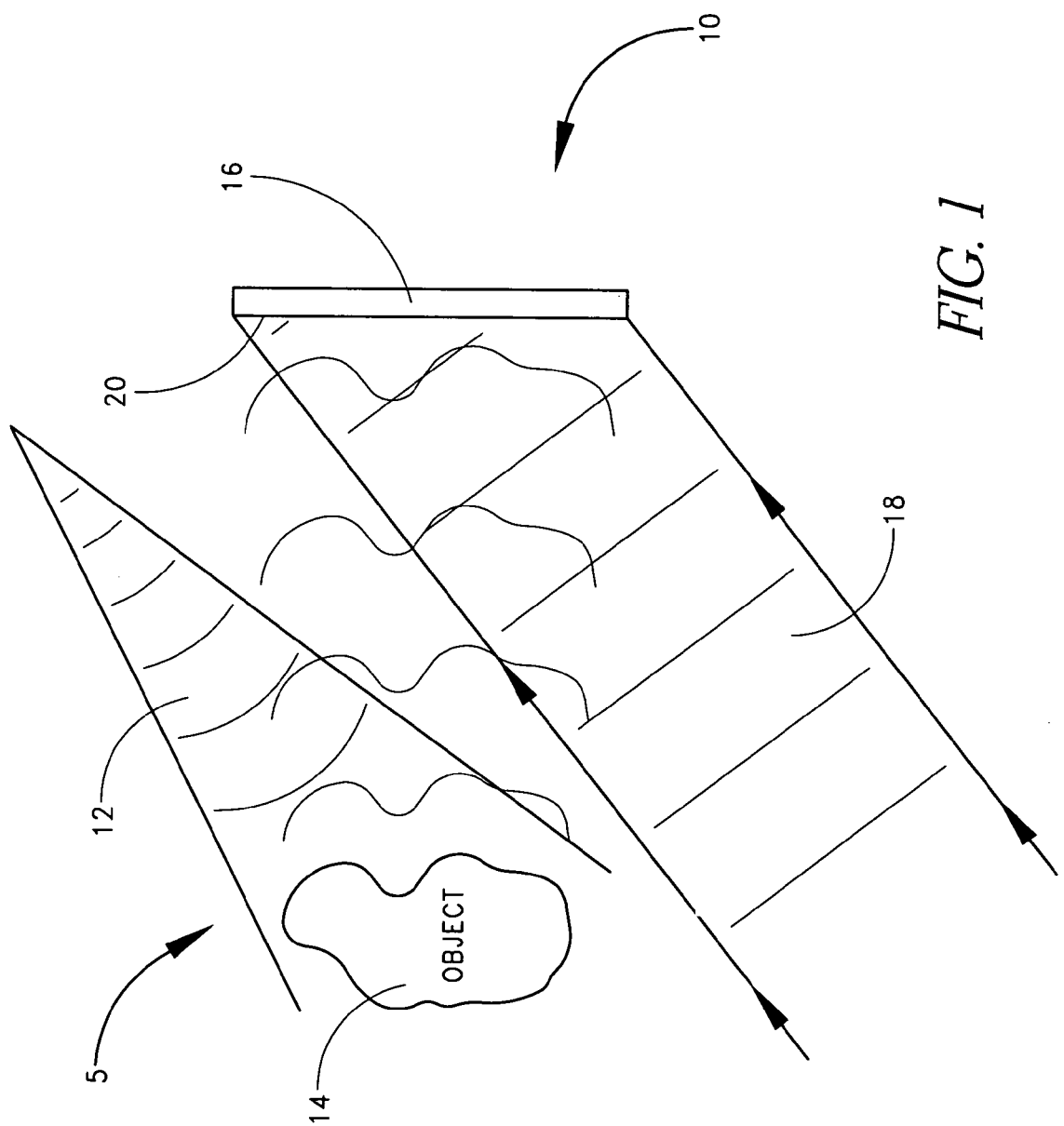
FIG. 1 is a schematic illustration depicting a free-space optical system for recording a diffractive optical element, namely, a hologram containing an image of an object.

Diffractive optical elements can be fabricated by overlapping and interfering two beams of coherent light originating from the same source to thereby produce an interference pattern or fringe pattern. A photosensitive medium, i.e., a recording plate, is located in the path of the two beams where they overlap and interfere. A system 5 for recording diffractive optical elements 10 such as holograms, which employs this technique, is depicted in FIG. 1. A first coherent beam 12, the object beam, is reflected from an object 14 and onto the recording plate 16, which is simultaneously exposed to a second coherent beam 18, the reference beam. The object and reference beams 12, 18 interfere creating an interference pattern on the recording plate 16. This interference pattern or fringe pattern is recorded by photosensitive material in the plate 16, which after processing takes the form of a surface relief pattern on a front surface 20 of the recording plate or spatially varying indexes of refraction just beneath its surface, e.g. about one to one hundred micrometers. To view an image recorded on the hologram 10, the recording plate 16 is illuminated with light, which is diffracted by the surface relief pattern or index variation pattern recorded therein. This diffracted beam contains the image, that is, by viewing the diffracted beam, an image of the original object 14 is visible. Information contained in the fringe pattern that is recorded in the hologram 10 can thus be employed to reproduce an image of the object 14. This recording plate 16, which may be a surface or volume hologram, may be an end-product itself. Alternatively, it may serve as a master or tool, commonly referred to as an H1, which can be used for producing one or more other holograms, which themselves can be volume or surface holograms and may be the end product. The terms master and tool are used interchangeably herein and refer to a medium having a characteristic pattern associated therewith that can be replicated in some fashion to produce one or more copies. These copies are commonly designated H2, H3, H4 etc., depending on the series of reproductions employed to reach the final version.

Figure 2A:
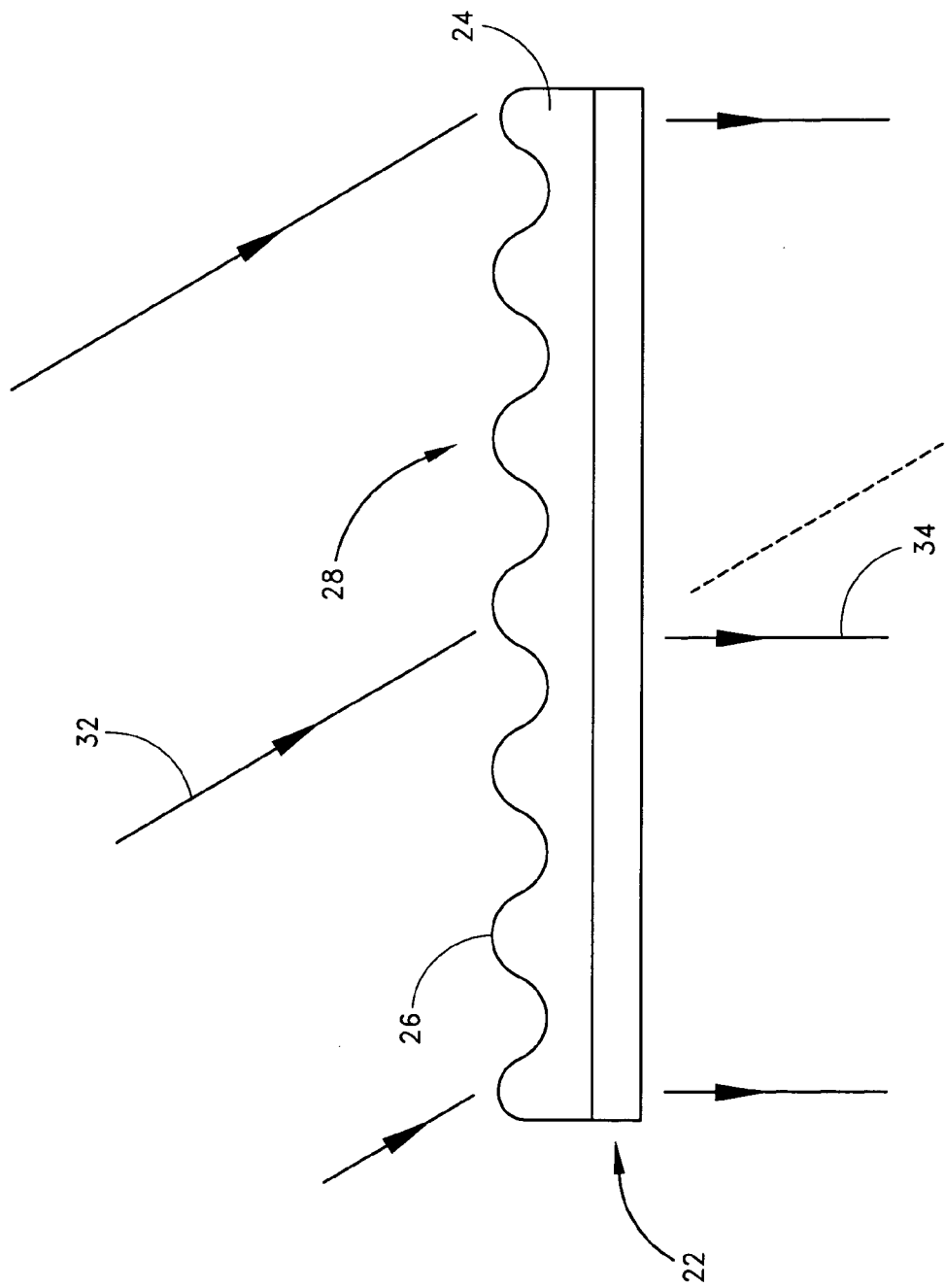
FIGS. 2A and 2B are schematic illustrations depicting cross-sections of transmissive and reflective surface holograms, respectively.
Figure 2B:
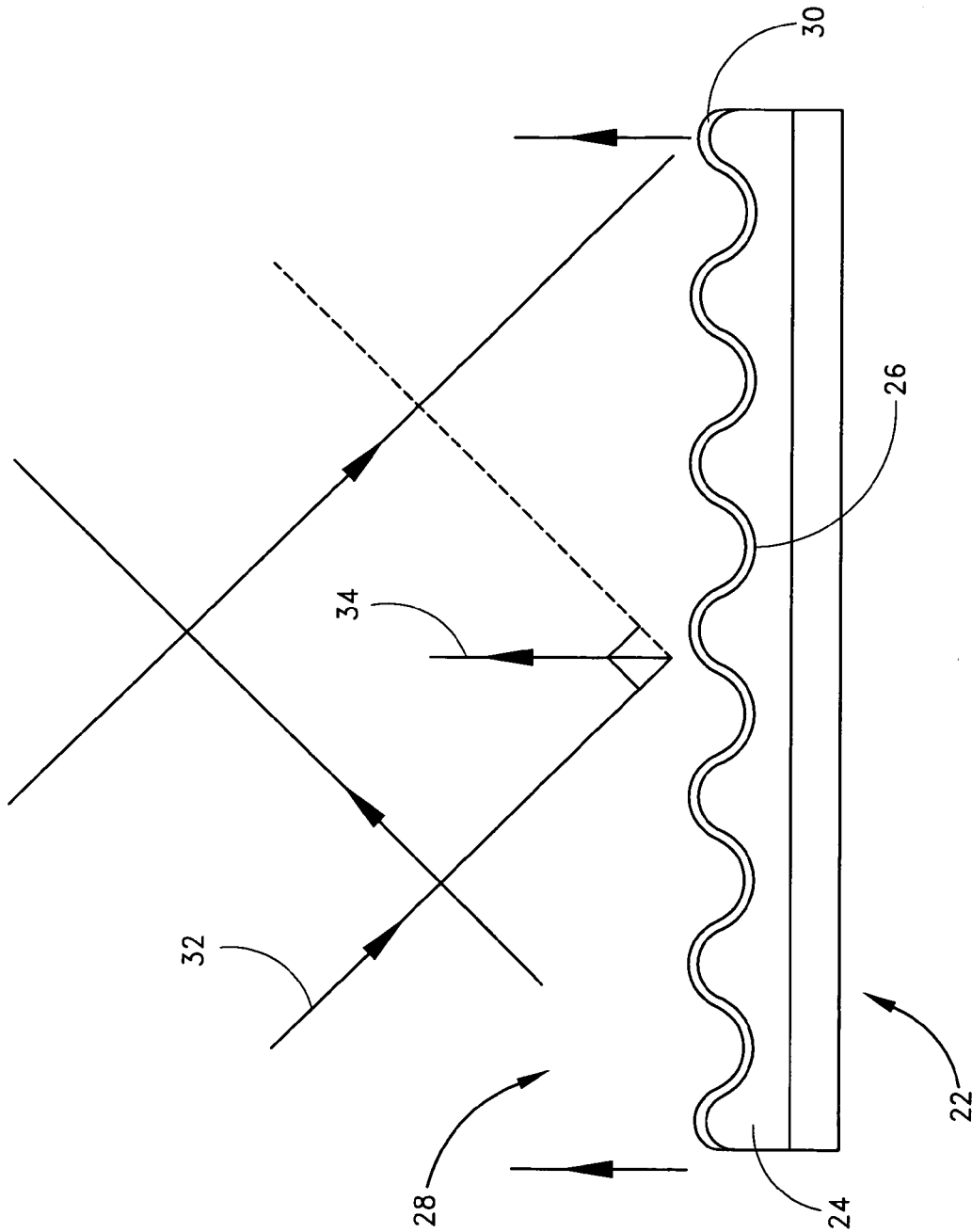

As discussed above and shown in FIGS. 2A and 2B, a surface hologram 22 comprises a layer 24 having a diffracting surface 26 with a predetermined varying topography, i.e., having a surface relief pattern 28 matching the set of interference fringes incorporated into the surface relief master tool used to form it. With surface holograms 24, the fringe pattern takes the form of ridges and valleys on the diffracting surface 26 of the hologram. For a transmission hologram such as shown in FIG. 2A, this layer 24 is substantially optically transmissive to allow light to readily pass therethrough. Reflection holograms, by contrast, may further comprise a reflective coating 30 such as metallization on the diffractive surface 26 such that light incident thereon will be reflected; see FIG. 2B. In either case, light incident on the surface relief pattern 28 is diffracted by diffractive features that take the form of the ridges and valleys. As shown, an input beam 32 directed onto the surface hologram 22 is either transmitted through or reflected from the hologram and by diffraction is transformed into an output beam 34 that contains a predetermined image or has desired beam shape determined by the arrangement, shape, and separation of diffractive features at the surface 26 of the hologram.

Figure 3B:
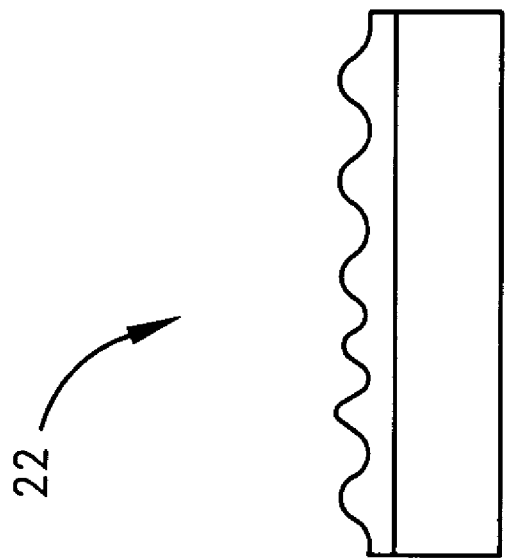
FIGS. 3A and 3B schematically illustrate a conventional method of forming a surface hologram, such as the ones shown in FIGS. 2A and 2B.
Figure 3A:
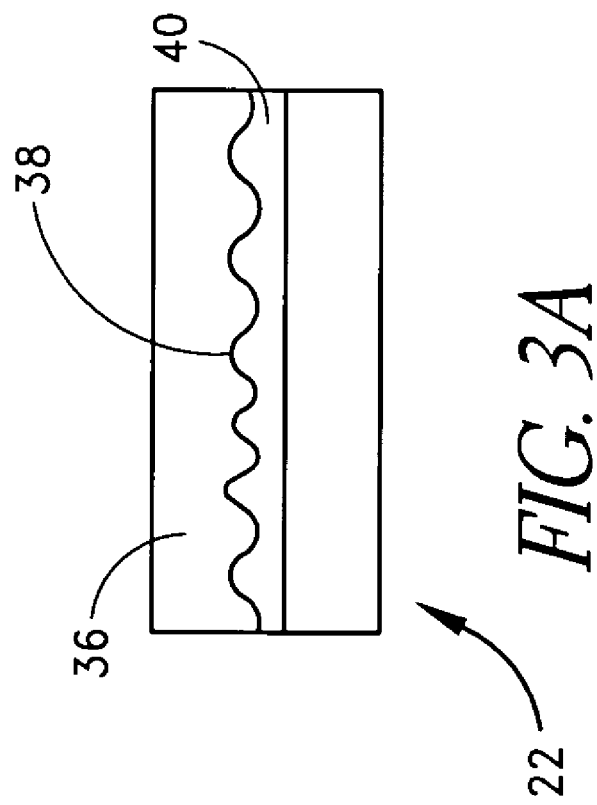

Surface holograms 22 can be fabricated by casting, employing a surface relief tool 36 containing a surface relief pattern 38 as a mold for a curable liquid as illustrated in FIGS. 3A-3B. A pool 40 of the curable liquid is in spatial relation with the surface relief tool 36 such that the liquid covers the peaks and flows into the valleys of the surface relief pattern 28. This liquid is then cured and hardened such that the peaks and valleys are replicated in a hardened material. The surface relief tool is subsequently removed. In this manner, the topographic features on the surface relief tool 36 can be reproduced in the surface hologram 22. Alternatively, the surface hologram 22 can be embossed, e.g., a film is softened with heat or a solvent and stamped and solidified against the hot or cold surface relief tool. Although the surface relief master 36 itself may comprise a hologram, production of surface holograms 22 is not so limited; the surface relief master may comprise a nontransmissive, nonreflective die capable of replicating the surface relief pattern by pressing the surface relief tool into softening film. Also, this surface relief master 36 need not be recorded using the free-space optical system 5 depicted in FIG. 1, but may be computer generated or created by other techniques.

Figure 4A:
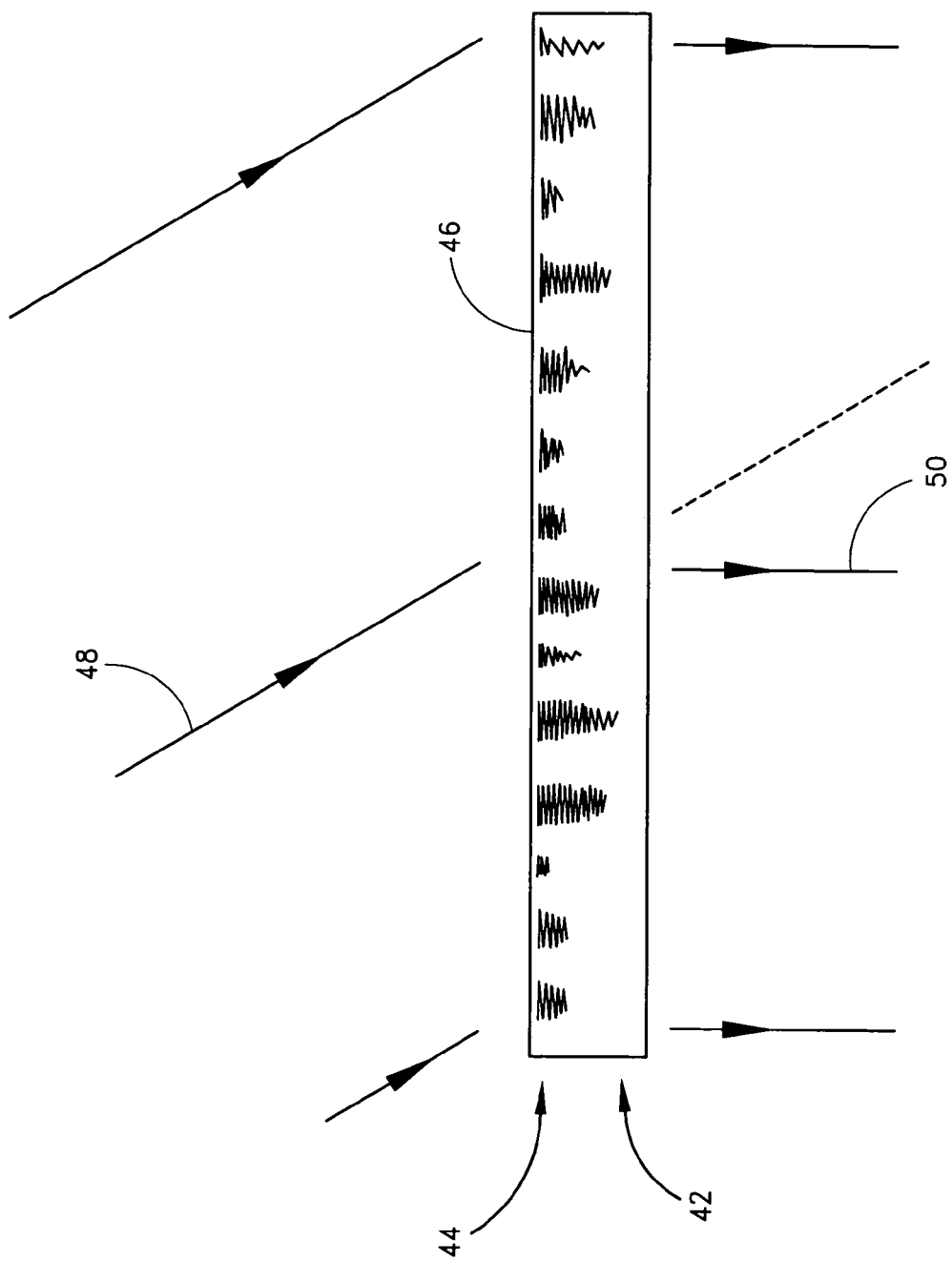
FIGS. 4A and 4B are schematic illustrations depicting cross-sections of transmissive and reflective volume holograms, respectively.
Figure 4B:
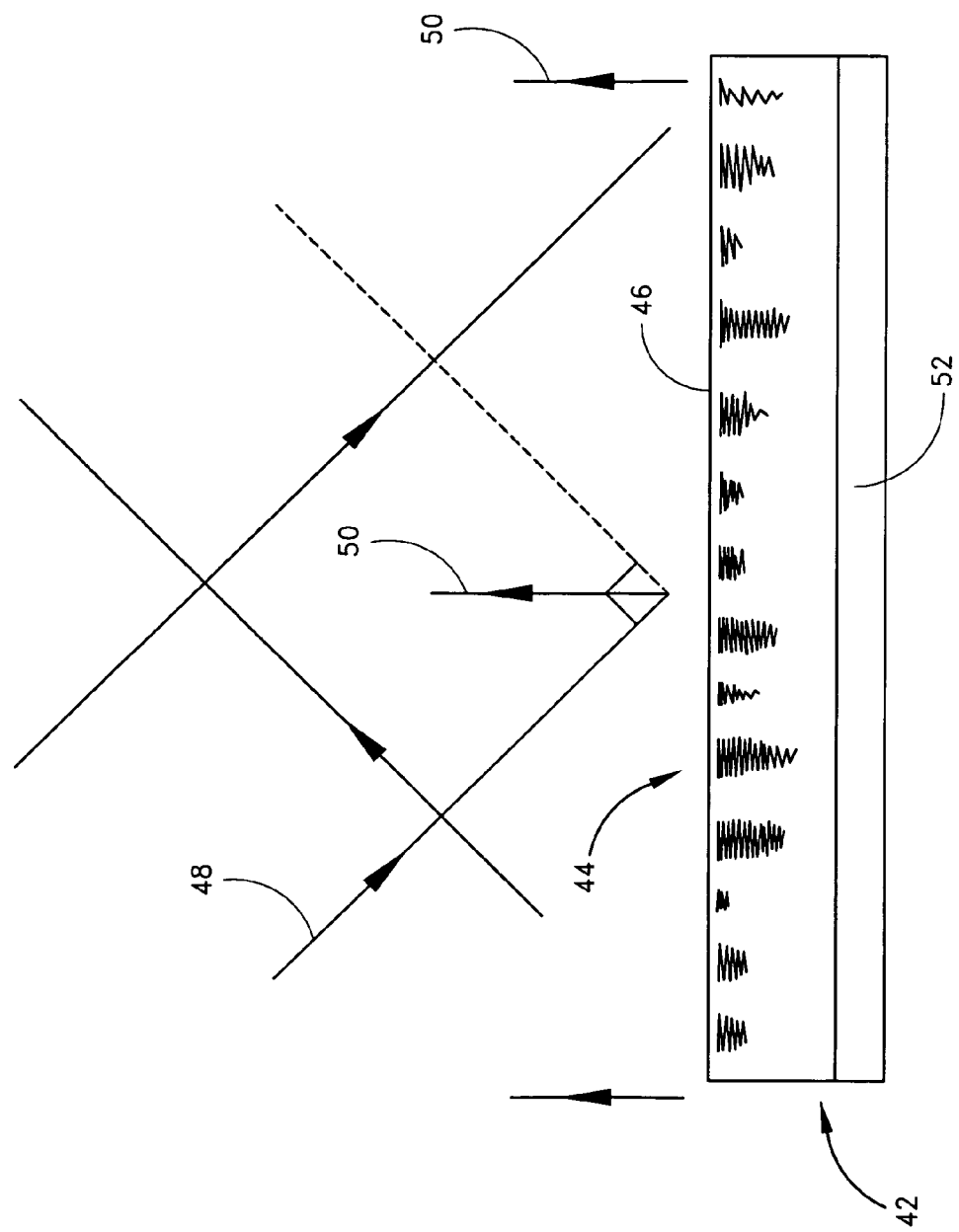

Volume holograms 42 contain diffractive features 44 defined by refractive index variations in a surface 46, the diffracting surface, of the hologram, as shown in FIGS. 4A and 4B. Instead of the surface relief pattern 28 on the surface hologram 22, refractive index variations forming a pattern in the volume hologram 42 diffracts light incident thereon. This hologram 42 may be a transmission hologram as shown in FIG. 4A, wherein an input beam 48, incident on the transmission hologram passes therethrough being diffracted during transit. At least one output beam 50 results. This output 50 may be viewed to observe the image formed by the hologram 42. In a reflection hologram (shown in FIG. 4B), a multiplicity of index of refraction interfaces cooperate to causes an input beam to be reflected. The predetermined pattern of index of refraction variations causes the input beam 48 to be diffracted into at least one output beam 50, which can be viewed to observe the image.

Figure 5:
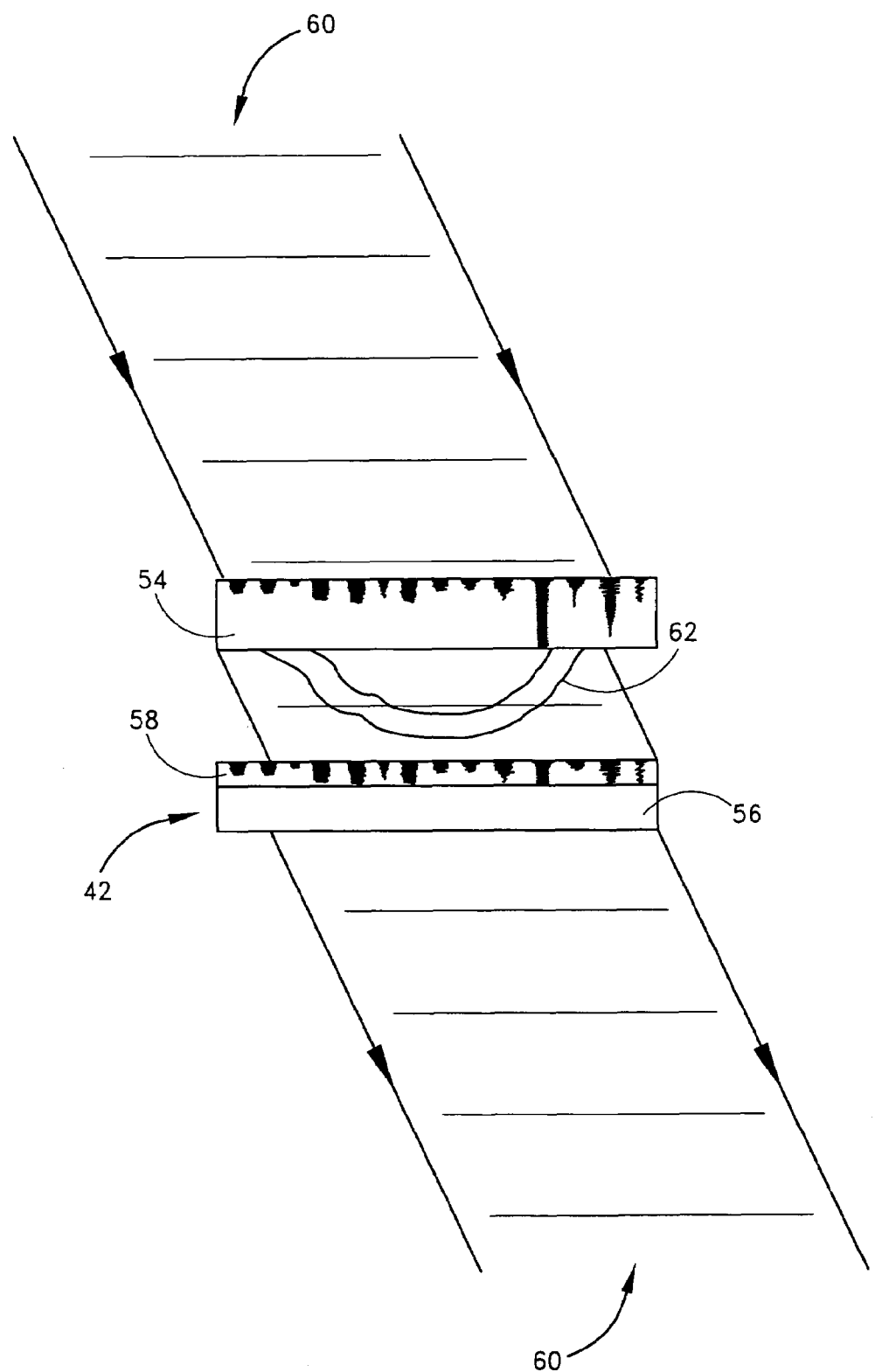
FIG. 5 is a cross-sectional view depicting a conventional method of forming a volume hologram herein referred to as contact copying.

To form the volume hologram 42 from a hologram master 54 in a process conventionally referred to as contact copying, the master tool which can be either a volume or surface relief hologram is positioned in front of a carrier substrate 56 containing a layer of photosensitive medium 58 formed thereon; see FIG. 5. A conjugate reference beam 60 is transmitted through the surface relief master 54 producing an image beam 62 which forms a real image that is projected onto photosensitive medium 58. The reference beam 60 itself also reaches the photosensitive layer 58. The image and the reference beams 62, 60 interfere creating a fringe pattern on the photosensitive film 58. Regions of high and low intensity in the fringe pattern corresponding to constructive and destructive interference will produce variations or undulations in refractive index within the photosensitive layer 58 after processing.

Since this method of forming volume holograms 42 from surface relief master tools 54 involves optical imaging and interference, this process is particularly susceptible to vibrations, air currents, temperature fluctuations, and stresses imparted on the surface relief tool and photosensitive medium 58. Such unstable environmental conditions will reduce the brightness of the image ultimately recorded in the volume hologram 42, possibly causing it to be completely extinguished. In addition, fabrication of volume holograms 42 via optical interference and diffraction methods requires a coherent light source. The light incident on the photosensitive medium 58 should have a coherence length equal to or greater than the optical path difference between the two beams being interfered to form the diffractive element. In the case of contact copying, these two beams correspond to the reference beam 60 passing through the master and the image beam 62 being created by the reference beam's interaction with the master. The reference beam 60 therefore typically comprises light within a narrow wavelength band, e.g., less than about one nanometer (nm), from a point source. The volume hologram 42, however, may produce higher efficiency, and thus higher throughput than surface holograms 22 and will provide a higher wavelength selectivity which may be desirable for a variety of applications.

In contrast, surface holograms 42 can be fabricated simply by casting, i.e., by bring the surface relief tool 36 in contact with the curable liquid and subsequently curing the liquid. As such, processes for forming surface hologram products from surface relief masters 36 are simple, reliable, and amenable to high production rates as precise optical stability is not required. Surface holograms 22, however, are typically less efficient and provide less angular selectivity than volume holograms 42. Surface holograms 22 also require metallization to be reflective and to preserve the optical properties of the diffractive optical element upon lamination.

Figure 6A:
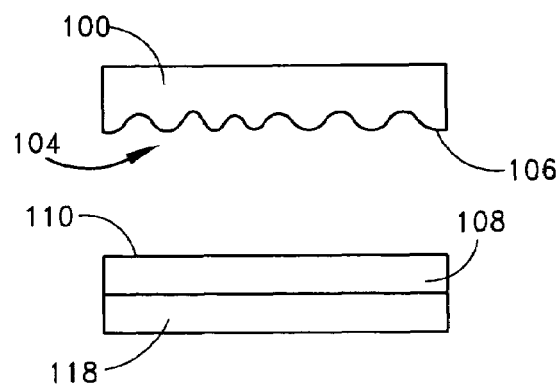
FIGS. 6A-6E schematically illustrate a method of manufacturing a volume hologram or other diffractive optical element that is one embodiment of the present invention.
Figure 6B:
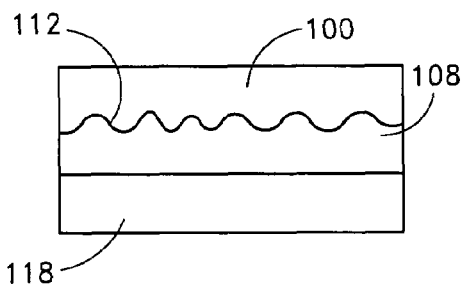

Another method shown in FIGS. 6A-6E employs a surface relief tool 100 to form a diffractive optical element 102 such as volume hologram, grating, or diffuser. This process offers the ease of fabrication customarily associated with conventional embossing and casting but provides a product that possesses performance characteristics comparable with conventionally recorded volume holograms. In this process, the surface relief tool 100 having a surface relief pattern 104 formed on a surface 106 thereof is applied to and contacted with a layer of soft or liquid, curable material 108 for example by embossing or casting. As discussed above, the terms tool and master are used interchangeably herein and refer to a medium having a characteristic pattern associated therewith that can be replicated in some fashion to produce one or more copies. As shown in FIGS. 6A and 6B, the surface relief tool 100 is a die for imprinting the surface relief pattern 104 in the layer of soft, curable material 108, which may be in the form of a soft film or a liquid. Peaks in the surface relief pattern 104 on the surface relief master 100 are covered by the soft curable material, and valleys within the master are preferably substantially completely filled by this curable material. This surface relief tool 100 preferably is the kind employed to form conventional surface relief diffractive optical element such as a surface holograms, grating, or diffusers and may itself be a surface hologram or other diffractive optical element. This tool may be formed using a free-space optical system 5 such as shown in FIG. 1 or may be computer generated, e.g., like conventional CGHs, or may be lithographically rendered or produced by other techniques well-known or yet to be devised. The tool may also be fabricated by mechanical ruling.

Nevertheless, physical contact is preferably made between the surface relief master 100 and the curable material as shown in FIG. 6B. The curable material may be painted or coated onto the surface relief master 100 or alternately a master may be pressed against a layer of curable material 108 with the peaks in the surface relief pattern 104 forming indentations in the layer of curable material. In various embodiments, hard or soft embossing, casting, etc. may be employed wherein the curable material maybe a soft film, a hard film, or a liquid. Pressure and/or heat may be applied to form an impression of the pattern in the curable material. In this manner, the surface relief pattern 104 on the master 100 is transferred to a surface 110 of the layer of curable material 108, the patterned surface 106 of the surface relief tool 100 itself forming an interface 112 with the curable material.

This surface relief master 100 may comprise material substantially optically transmissive to light, such as for example ultraviolet (UV) light, in the case where the cured material comprises UV curable material. Alternatively, this surface relief master 100 may comprise metal or other highly thermally conducting material in the case where heat is to be applied to the surface relief tool to cure the curable material. Materials sufficiently transmissive to electron beams are recommended when e-beams are used for curing. Examples of material suitable for surface relief masters 100, as is well-known, may include nickel, silicone and polymer but is not limited to any particular material or set of materials. The ridges and valleys that form the surface relief pattern 104 on the master 100, e.g., shape, amplitude, and periodicity of the undulations, may be regular or irregular, and the size and arrangement of these undulations are not be limited to any particular dimension or kind.

Figure 6C:
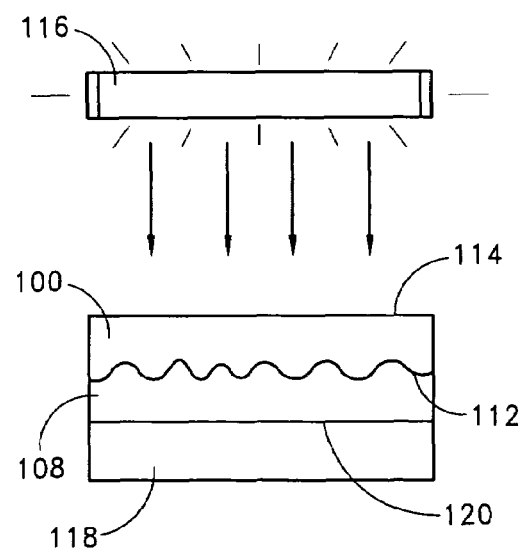

As depicted in FIG. 6C, an opposite side 114 of the surface relief tool 100 is exposed to an energy source 116 used to cure the layer of curable material 108. This energy source may, for example, comprises a source of electromagnetic energy such as light, and more particularly UV light as in the case where the curable material can be cure with light having a wavelength, e.g., within a range of between about 250 and 420 nanometer (nm) or elsewhere in the UV range. In this case, the surface relief master 100 is preferably substantially optically transmissive to light from the light source that activates curing of the curable material.

In another example, the energy source 116 may possibly comprise a source of heat where the curable material can be thermally cured or is otherwise responsive to heat. Heaters, for example, may be mounted to the side 114 of the surface relief master 100 opposite the surface relief pattern 104 in a manner such that heat is readily conducted from the heaters into the master. Alternatively, this side 114 of the master 100 may face a radiative heater that can be used to heat the surface relief tool. In this case where heat is used for curing, the master 100 may be an opaque, non-reflective die employed to imprint the surface relief pattern 104 recorded thereon into the curable material. As described above, this tool may be formed using a free-space optical system 5 such as shown in FIG. 1 or may be computer generated or produced by other techniques well-known or yet to be devised. The tool may, for example, fabricated lithographically or by mechanical ruling.

In yet another example, the energy source 116 may possibly comprise a source of an electron beam appropriate for curing the curable material. Such electron beams sources and electron beam activated curable materials are well known in the art. When e-beam curing is to be used, preferably the master comprises material and has a thickness sufficiently small such that the high energy electrons can be directed therethough.

The layer of curable material 108 may comprises materials conventionally employed in fabrication of surface holograms such as monomers and oligomers as well as and photoinitiators. Examples of some monomers and oligomers include SR series and CN series available from Sartomer Company, Oaklands Corporate Center, 502 Thomas Jones Way, Exton, Pa. 19341. Another suitable curable material comprises a resin, Eberyl, sold by UCB Chemicals Corporation, 2000 Lake Park Drive, Smyrna, Ga. 30080.

The curable material may comprise a polymer that is activated by exposure to energy such as electromagnetic energy, light, and more particularly, UV light. UV photoinitiators, for example, may be activated by light within the range of between about 300 and 400 nanometers. Curable material that is activated with light having wavelengths outside this UV range is also possible. Urethane, acrylate, and epoxy are some polymers that are suitable for forming these diffractive optical elements.

This curable material further comprises a dopant such as liquid crystal, which is characterized more broadly herein as an optical liquid; see R. L. Sutherland et al, Chem. Mater., Vol. 5, No. 10, 1993 pp. 1533-1538. Nematic liquid crystals are particularly well suited for this application. Exemplary types include E7 and BL type materials comprising mixtures of cyanobiphenyls and higher aromatic homologues as well as commercially available TL compounds comprising mixtures of chloro and fluoro substituted mesogens. Liquid crystal under the tradename E7 is available from EM Industries, Inc., 7 Skyline Drive, Hawthorne, N.Y., 10523.

The dopant may comprise an orientatable microstructure such as an optical liquid, and more particularly, as discussed above, liquid crystal. Without subscribing to any particular scientific theory or explanation, it is possible that orientatable microstructures reorient themselves in response to application of the surface relief tool to the material containing them. The curable material can then be cured to fix the orientation.

This soft, curable material may be formed on a substrate carrier 118 comprising any of a plurality of structures that provide physical support for the layer of soft curable material 108 such as for example a sheet of plastic or glass. The size and thickness of this substrate carrier 118 may vary widely, with consideration given to the particular application. Although a substrate carrier 118 is shown as providing support for the curable material, the diffractive optical element may be formed without a carrier substrate.

To produce the hologram or other diffractive optical element 102 from the surface relief master tool 100, energy is propagated through the tool toward the interface 112 between the tool and the curable material. The energy therefore emanates from the interface 112 into the curable material and propagates toward a side 120 of the layer of curable material 108 opposite the interface. Preferably, the curable material is selected such that the energy passed through the surface relief master 100 initiates curing. For example, in the case where the curable material comprises UV curable polymer and the surface relief master 100 is substantially optically transmissive to this UV light, UV light transmitted through the master will reach the interface 112 and initiate curing at this location.

Figure 6D:
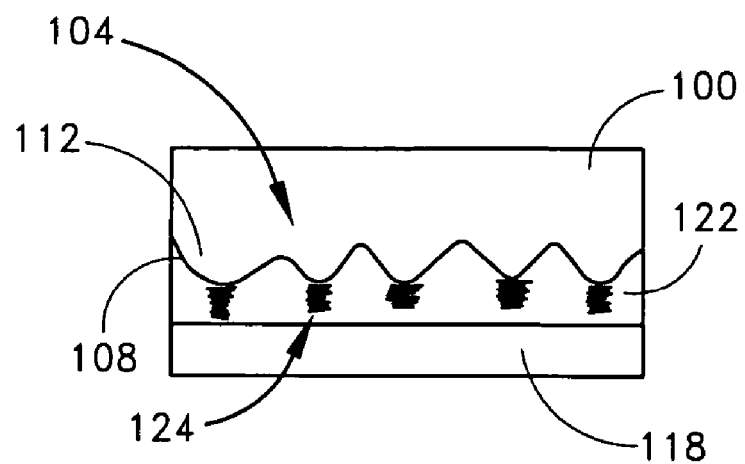

The result of the curing, schematically illustrated in FIG. 6D, is an optically transmissive diffraction layer 122 containing a pattern of index variations 124 that substantially matches the surface relief pattern 104 on the surface relief master 100. The peaks and valleys on the surface relief pattern 104 on the master 100 influence the resulting index of refraction within the cured diffraction layer 122. As a consequence, the index of refraction will be modulated in a manner corresponding to the undulations at the interface 112. A diffractive optical element 102 similar to a volume hologram 42 has essentially been formed beneath the surface relief master 100. As with conventional volume holograms 42, the variations in index of refraction form diffractive features that diffract light incident thereon. These diffractive features extend into the cured material from the boundary 112 between the surface relief master 100 and the diffraction layer 122. The pattern of diffractive features 124 is dependent on the surface relief pattern 104 on the surface relief tool 100, which is configured to produce the desired image or beam shape.

Without subscribing to any particular scientific theory or construct, it appears that undulations at the interface 112 between the surface relief master 100 and the layer of curable material 108 influence the curing process. Variations in the topography of this interface 112 may possibly affect the nucleation and growth of crystals or polymer chains resulting in varying index of refraction. In the case where the curable material comprises liquid crystal doped UV curable polymer, the interface pattern may mechanically influence the orientation of the liquid crystal in the layer of polymer producing slightly different structural characteristics at different locations in the cured material. Regions may therefore systematically possess different indices of refraction depending on topographic features in the surface relief tool 100. The varying topography of the interface 112 may alternatively induce stresses within the crystallized or polymerized structure that alter the refractive index. Various other explanations are also considered possible; however, a physio-chemical process may be at least partially responsible for the ability to form diffractive elements in a manner described above.

Regardless of the theoretical underpinning for this affect, the method described herein can be employed to fabricate a diffractive optical element 102 using a surface relief tool 100. A predetermined pattern of diffractive features 124 corresponding to variations of index of refraction can be formed to create a diffractive optical element 102 such as a volume hologram or diffraction grating, without relying on diffraction and interference from a master 100. More specifically, to form the predetermined pattern of index variations 124 in the diffractive optical element 102, energy such as electromagnetic energy, and in particular, UV light, is propagated through the surface relief tool 100. Although formation of the pattern of diffractive features 124 is dependent upon the surface relief features in the surface relief tool 100, it is substantially independent of diffraction of the energy, e.g., UV light, from these surface relief features in the tool. In contrast with contact copying, which is conventionally used to record volume holograms from holographic masters, constructive and destructive interference is not employed to project interference patterns or interference fringes onto the layer of curable material 108 to produce refractive index variations. Because the radiant emission propagated through the surface relief master 100 is not interfered to form the diffractive features in the layer of curable material 108, this energy incident on the curable material may comprise incoherent or coherent light or possibly heat. Suitable incoherent light sources include extended sources and sources having a broad wavelength spectrum. Incandescent lamps, arc lamps, and fluorescent lamps may be suitable. Light that can be transmitted through the surface relief tool 100 to appropriately cure a layer of curable material 108 and produce diffractive features therein may include light having a broadband between about 250 to about 700 nanometers or even outside this range. White light, even sunlight, may be employed.

The result, as shown in FIG. 6D, is a diffractive optical element 102 comprising a diffractive layer 122 of substantially optically transmissive material having diffractive features formed therein. This optically transmissive diffraction layer 122 contains a predetermined pattern of refractive index variations 124 that will diffract a light beam incident thereon in a desired manner. These diffractive features originate at the undulating boundary 112 between the surface relief tool 100 and the substantially optically transmissive diffraction layer 122 and extend only from one side of this boundary into the cured material. This undulating boundary 112 has an undulating pattern, the surface relief pattern 104, which corresponds to the predetermined pattern of refractive index variations 124. This pattern contains 124 the information necessary to diffract an incident light beam into the desired image or beam shape associated with the output beam.

Figure 6E:
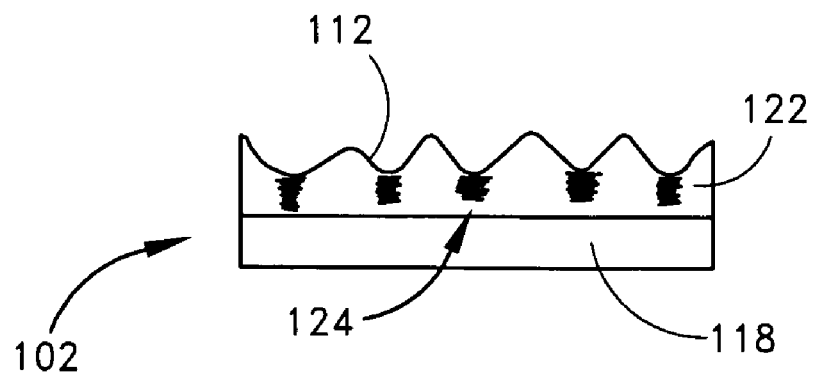
Figure 7:
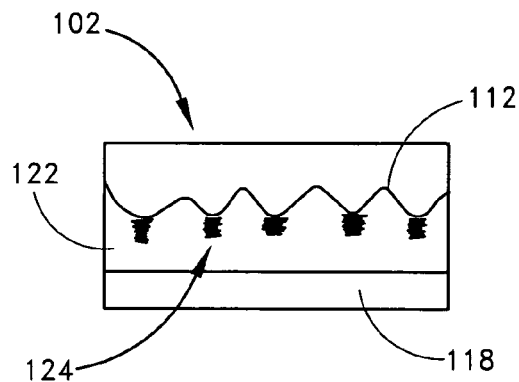
FIG. 7 is a cross-sectional view schematically illustrating a diffractive optical element formed by the process depicted in FIGS. 6A-6E and having a protective layer formed thereon.

After propagating the light or other forms of energy through the master 100 and into the layer of curable material 108, the surface relief tool may be removed and separated from the optically transmissive diffraction layer 122 as depicted in FIG. 6E. The undulating boundary 112 therefore remains. Light incident on the DOE 102 may be diffracted by the undulating boundary 112 as well as the diffractive features within the diffractive layer 122. To remove the diffractive effects of the undulating layer 112, an index-matching layer 130 may be formed on the surface 112 of the undulating boundary as depicted in FIG. 7. This index-matching layer 130 preferably is substantially optically transmissive and has an index of refraction close to that of the diffraction layer 122 to minimize Fresnel reflection at the interface between the two layers and thereby effectively removing the optical effect of the undulating boundary and preventing it from diffracting an input beam thereon. By eliminating reflection at the undulating boundary 112, this boundary is no longer optically present; the index-matched layer 130 therefore can remove the effects of diffraction contributed by the undulating boundary.

Various materials can be employed to form this index-matching layer 130. Preferably, however, the index-matching layer 130 and the optically transmissive diffraction layer 122 have substantially similar coefficients of thermal expansion to minimize stress that may develop between the two upon exposure to temperature fluctuations. Such an arrangement should enhance reliability and prevent the index matching layer 130 from tearing away from the cured material. Most preferably, however, the index-matching layer comprises material substantially similar to the cured material of the diffraction layer 122 such that the two layers are fused together as one and the surface relief of the undulating boundary is eliminated. For example, in the case where the cured material in the diffractive layer 122 comprises UV curable polymer doped with liquid crystal, this additional layer 130 formed thereon preferably also comprises the UV curable material with or without the liquid crystal. In such cases, covalent bonding may provide a strong bond between the two layers 122, 130. In addition, substantially alike coefficients of thermal expansion should reduce thermally induced stress at the interface 112 between the two layers 122, 130.

This layer 130 may also be a functional layer that performs another purpose, e.g., color filtering, protection, etc. This layer may also include an additional surface relief pattern for diffracting light incident thereon. This surface relief pattern may be the same as or different from the diffractive pattern formed by the index variations. This surface relief pattern may be imprinted in the layer 130 by a surface relief tool, for example, as described.

In one embodiment, instead of removing the surface relief master 100, tearing it away from the diffraction layer 122, it is left thereon to protect the diffractive elements; see FIG. 6D. In such cases where the master 100 remains on the diffraction layer 122, the surface relief tool preferably is substantially optically transmissive to light for viewing purposes and may have an index of refraction substantially similar to the overall index of the cured material in the diffraction layer 122 to remove diffractive effects of the undulating boundary 112 if appropriate for the desired application. In addition, the surface relief master 100 preferably has a coefficient of thermal expansion substantially the same as the cured material to substantially prevent detachment therefrom.

Figure 8:
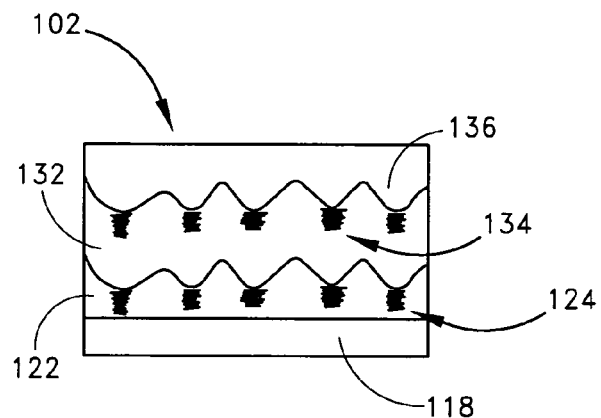
FIGS. 8 AND 9 are cross-sectional views schematically illustrating diffractive optical elements formed by the process depicted in FIGS. 6A-6E and comprising multiple diffraction layers.

In still other embodiments, an additional layer of curable material can be formed on the diffraction layer 122. This additional layer of curable material can be cured to provide another diffraction layer. In the case where the additional layer is to be patterned with diffractive features, the curable material includes the appropriate composition. For example, the additional layer of curable material may comprise orientable microstructure, optical liquids, and the like. In particular, the material may comprise UV curable polymer doped with the liquid crystal, especially in the case where the diffraction layer 122 beneath was formed from such a composition. In a manner similar to that described above, a surface relief tool 100 can be physically contacted to this additional layer of curable material to form indentations therein and energy propagated through the tool. Upon curing, diffractive features will be formed beneath the surface relief master 100 as before. FIG. 8 depicts such a diffractive optical element 102 comprising first and second diffractive layers 122, 132 each including a set of diffractive features 124, 134, the second layer being stacked on the first. In the embodiment shown, the diffractive features in the two layers 122, 132 match. Accordingly, the two sets 122, 132 of diffractive features- can act together on an incident beam. The pattern of diffractive features 134 in the second layer 132, however, need not be identical to that of the first layer 122 and in other embodiments, the two patterns 124, 134 are made to differ. A index matching layer 136 comprising, for example the same material as the diffraction layer 122, can be formed on the uppermost layer, here, the second layer 132, as discussed above to remove the contribution of the undulating layer to diffraction provided by the second layer.

Figure 9:
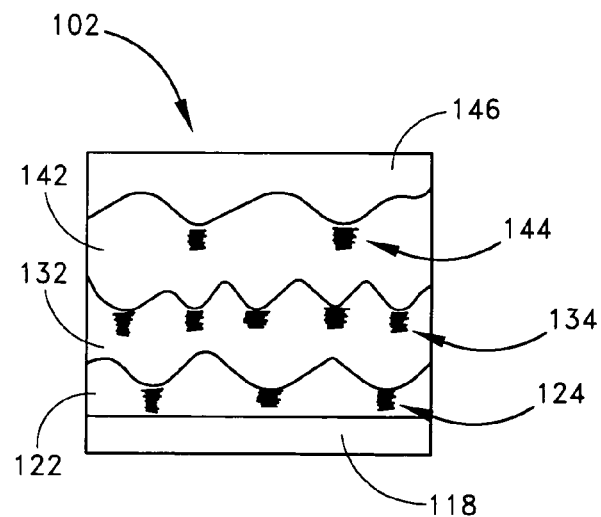

Additional diffractive layers can also be included. FIG. 9 depicts a diffractive element comprising a three diffraction layers, a first, second, and third, 122, 132, 142, stacked on each other. An index-matching layer 146 is formed over this plurality of layers. This layer 146 preferably comprises the same material as the diffraction layer 142 beneath to eliminate the surface relief on the uppermost layer. The three diffraction layers 122, 132, 142 may contain three sets of diffractive features 124, 134, 144 any of which are arrange in the same pattern. Alternatively, the three patterns of index variations 124, 134, 144 may be different from each other. As discussed above, preferably the coefficients of thermal expansion are substantially the same in the three diffraction layers 124, 134, 144, the indices of refraction are matched, and the same material may be employed in some embodiments such that the layers fuse together as one. By index matching or employing the same curable material in the three layers 124, 134, 144, diffraction from surface relief features at boundaries between the layers is substantially eliminated.

Figure 10:
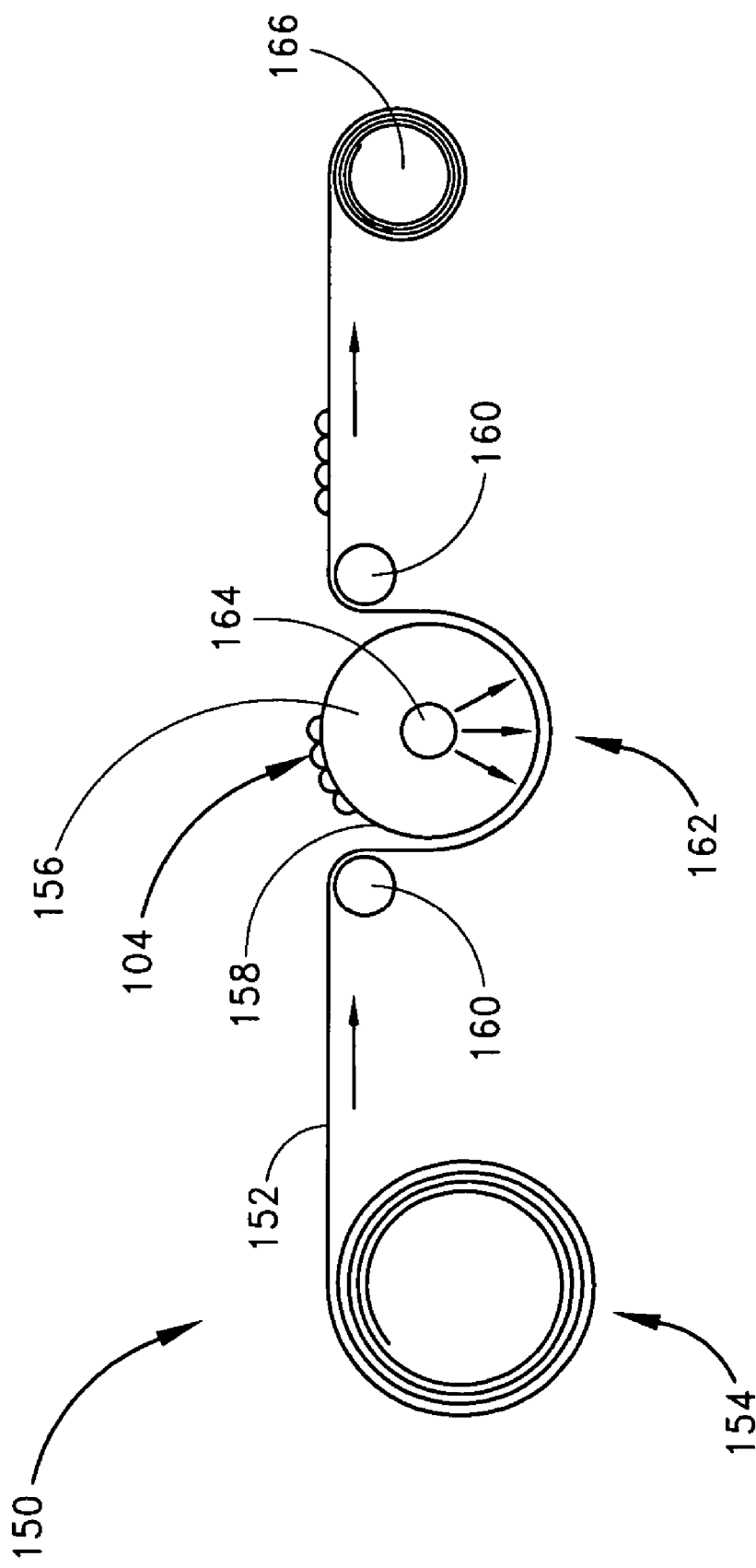
FIGS. 10-12, 13A and 14 are schematic diagrams illustrating various embodiments of apparati for manufacturing the diffractive optical elements.

Apparatus 150 for forming diffractive optical elements 102 using surface relief tools 100 as described above may take many forms. In one embodiment shown in FIG. 10, a sheet coated 152 with curable material and fed by a film supply 154 is ran past a master drum 156 having an outer surface 158 on which the surface relief pattern 104 is formed. This drum 156 is herein referred to as a master drum. Rollers 160 are disposed adjacent the drum 156 to force the coated sheet 152 against the surface relief pattern 104. The portion 162 of the drum 156 where the curable material makes contact with the drum and is cured designated the contact area. The master drum 156 contains a source of UV light 164 that irradiates the contact area 162 to form diffraction features in the curable material. The resultant product is taken-up by a rotating spool 166. Large sheets of diffractive optical elements 102 such as holograms can be formed in this manner.

Figure 11:
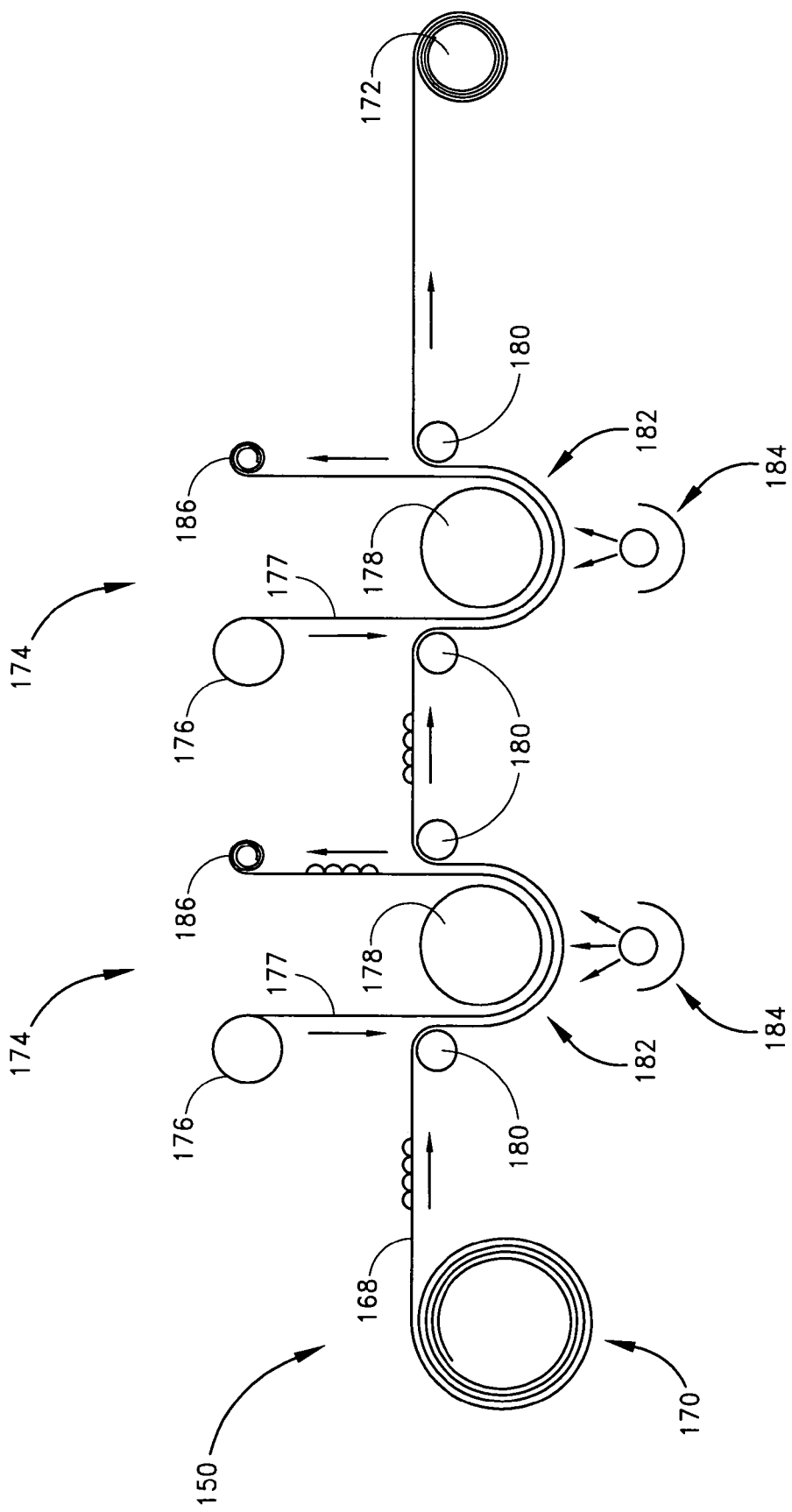

In an alternative design depicted in FIG. 11, the surface relief pattern 104 is contained on a tape 168, herein referred to as a master tape. The tape 168 is fed from a master tape supply 170 and is taken up by a spool 172. This embodiment includes two stations 174, each accommodating a separate supply 176 of sheet 177 coated with curable material; however, any number of stations can be included. A drum 178 and set of adjacent rollers 180 in each station 174 are configured to press the master tape 168 across the sheet 177 coated with a curable material in a region 182 adjacent a source of UV light 184. These drums 178 may be chilled to prevent thermal build-up. In a fashion described above, a pattern of refractive index variations are imparted on the coated sheet 177, which is cured by the UV light incident thereon. The resultant product is taken-up by rotating spools 186 dedicated to each station 174. More stations 174 can be included to increase production rate.

Figure 12:
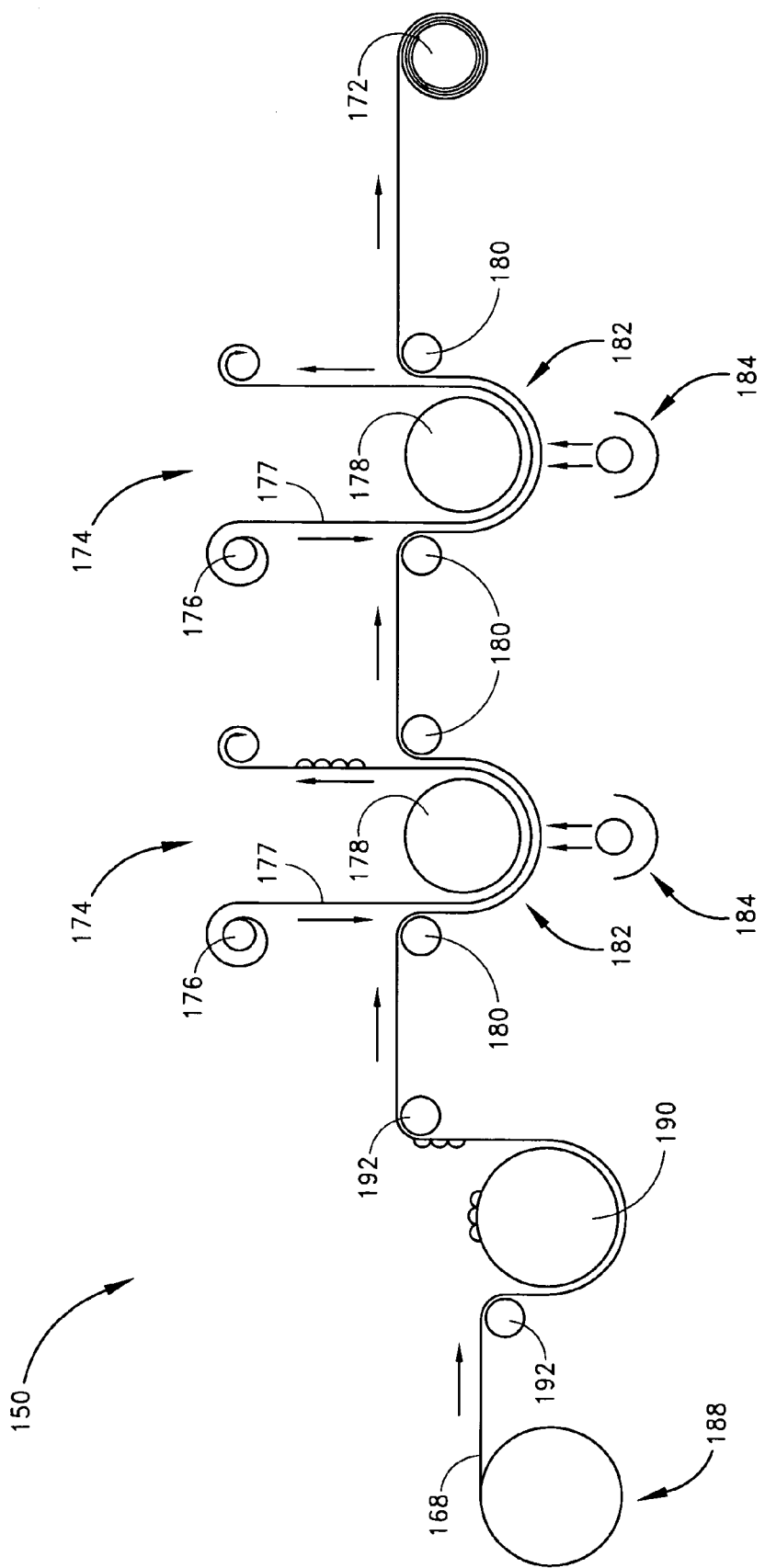

FIG. 12 depicts an embodiment similar to that shown in FIG. 11 but that includes a master drum 190 for forming the master tape 168 via an embossing process, which may include the application of pressure or heat (e.g., lamps) and pressure. The tape 169 is feed from a supply 188 past the drum 190, which has rollers 192 adjacent thereto to press the tape against a surface relief pattern 194 on the drum. The surface relief pattern 194 on the drum 190 is imprinted on the master tape 168, which is then fed to the two stations 174 in a manner discussed with reference to FIG. 11.

Figure 13A:
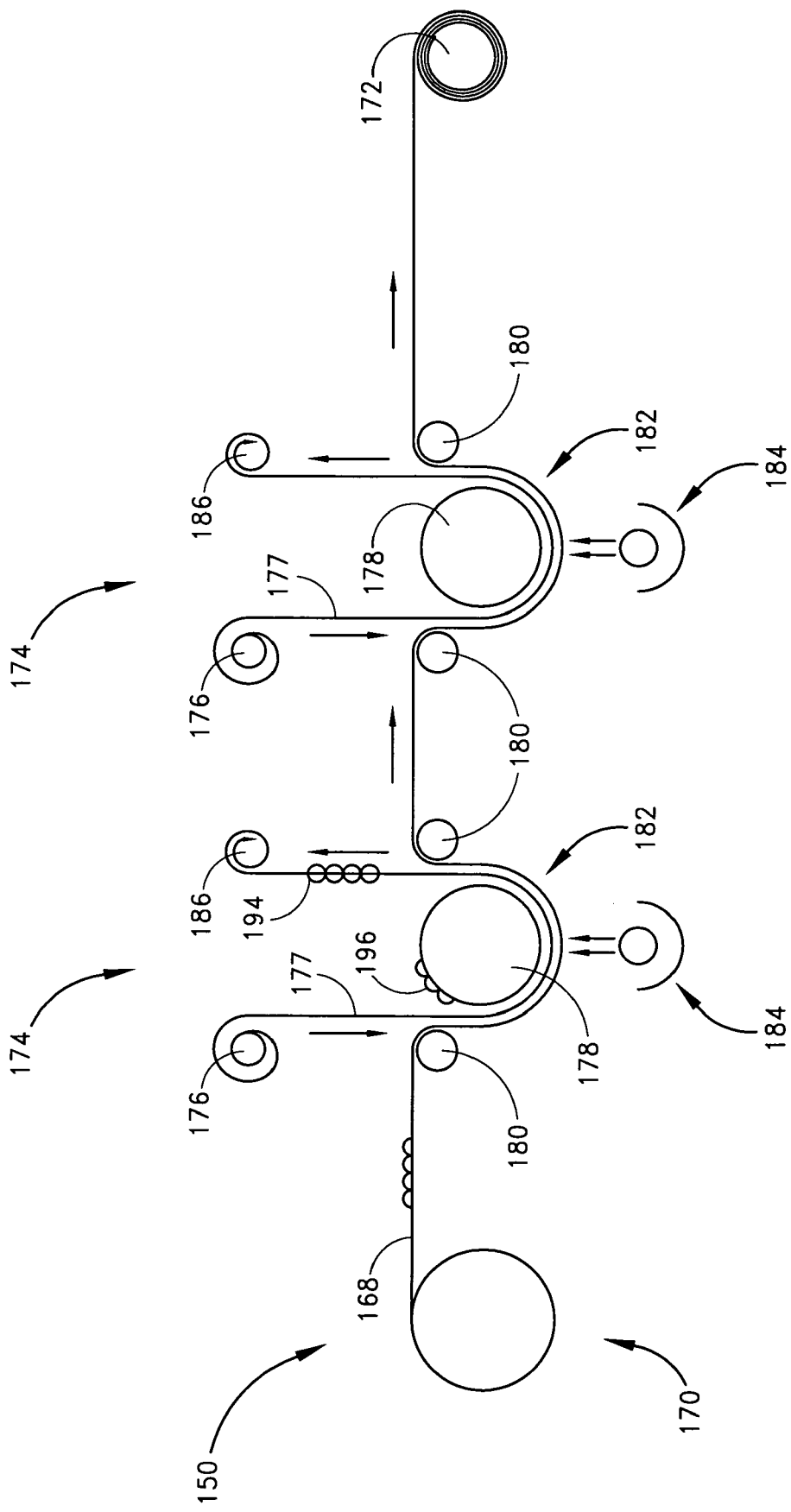
Figure 13B:
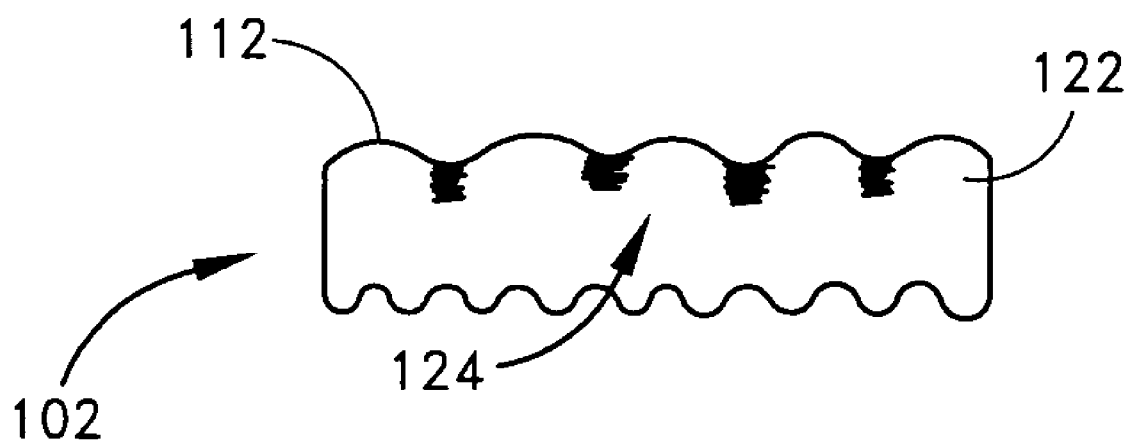
FIG. 13B shows a cross-section of the product that may be produced by the apparatus depicted in FIG. 13A.

An apparatus can be configured to provide a pattern of refractive index variations 124 adjacent one side of the sheet 168 and a surface relief pattern 194 on an opposite side of the sheet. In this manner, a volume hologram and a surface hologram can be combined in one product. The apparatus 150, shown in FIG. 13A, is similar to that depicted in FIG. 11 with the exception that the drum 178 in one of the stations 174 contains a surface relief pattern 196 thereon which imprints a surface relief pattern 194 on one side of the sheet. The master tape 168 imprints a surface relief pattern on the layer of curable material 108 on the other side of the sheet. Ultraviolet light is propagated through the master tape 168, and thus, diffractive features comprising index of refraction variations are imparted on the cured material facing the master tape. The result is a surface relief pattern and matching index variations on one side and another same or different surface relief pattern on the other side; see FIG. 13B. For example, a surface relief hologram 112 may be formed on one side with associated volume hologram 122 proximal to and extending therefrom and on the other side is another surface relief hologram 200 having a same or different pattern as the volume hologram. The volume hologram, can thus be surrounded by two surface relief holograms 112, 200.

Figure 14:
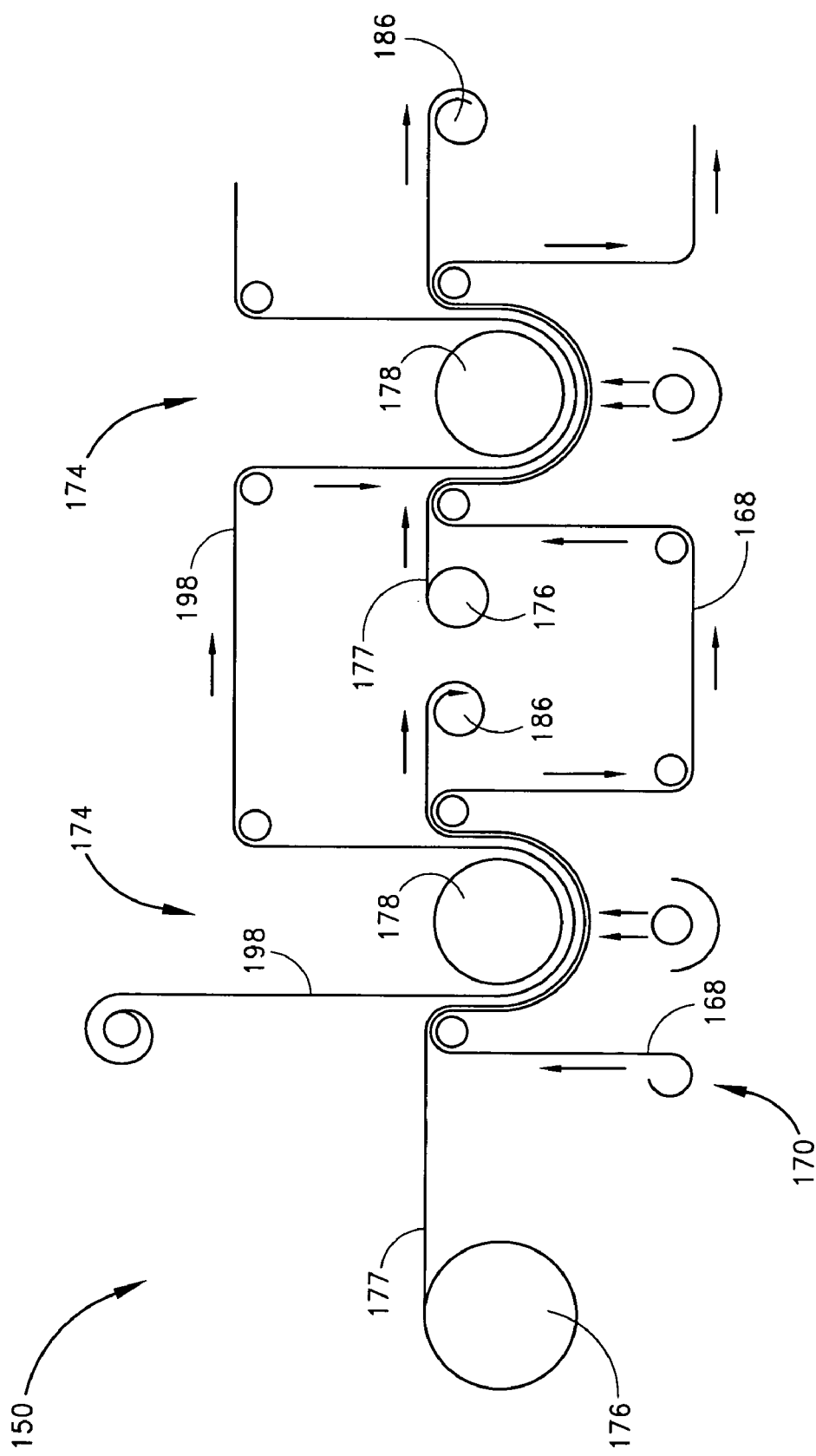

The product output by the apparatus of FIG. 13A can alternatively be fabricated by the apparatus illustrated in FIG. 14, which employs a master tape 198 instead of a master drum 178 to form the surface relief pattern 194 in the sheet. As above, additional stations 174 can be included to accommodate additional output. The system 150 can also produce a sheet containing a volume hologram 122 on one side and a surface hologram 200 on the other side such as shown, for example, in FIG. 13B.

Figure 15A:
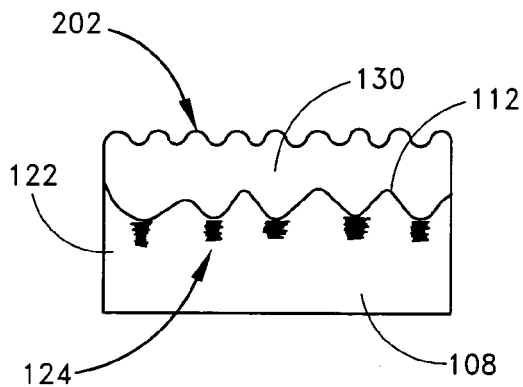
FIGS. 15A-15C and 16A-16D are cross-sections schematically depicting diffractive optical elements comprising one or more diffractive pattern formed by refractive index variations and one or more surface relief pattern formed above or below the index variations wherein any of the patterns can be same or different from each other.
Figure 15B:
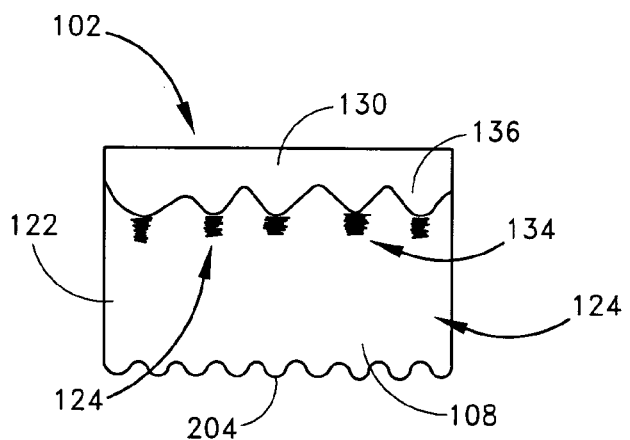
Figure 15C:
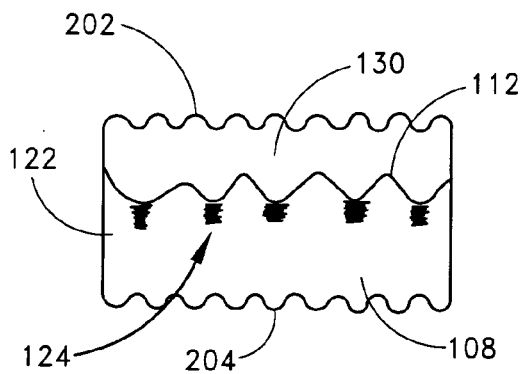
Figure 16A:
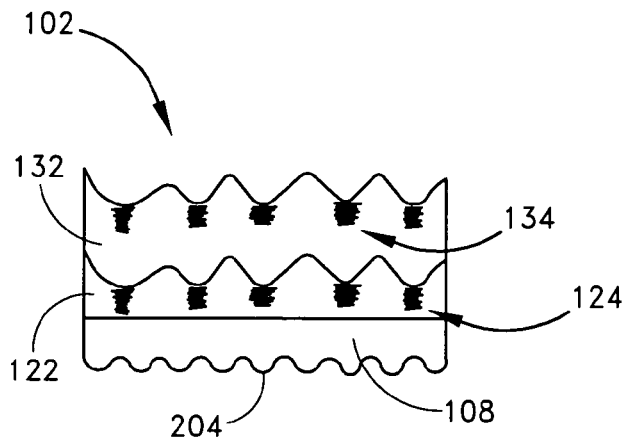
Figure 16B:
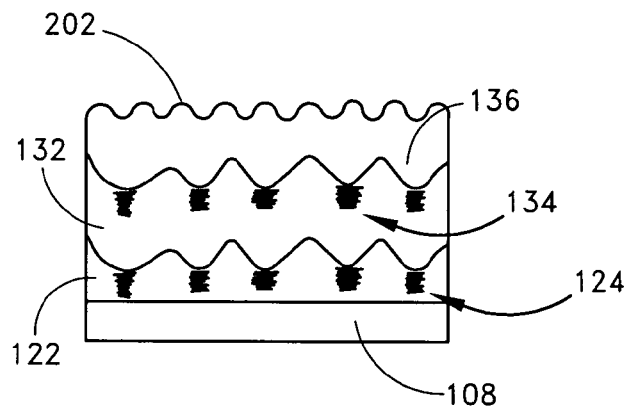
Figure 16C:
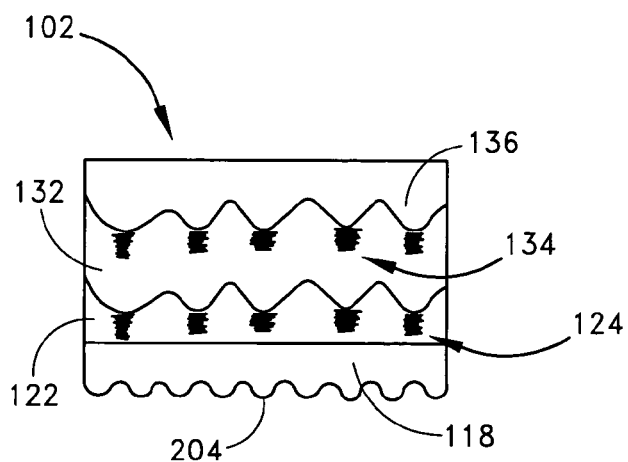
Figure 16D:
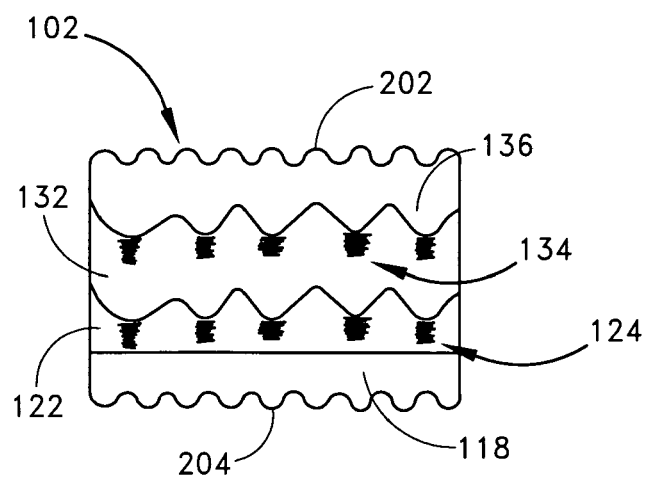

Various combinations of diffractive patterns formed from refractive index variations as well as surface relief patterns located above and/or below the index variations are possible as shown in FIGS. 15A-15C. A surface relief pattern 202 may be imprinted on the layer 130 formed over the curable material (see FIG. 15A). This surface relief pattern 202 may match the index variation pattern 122 or may be differ from it. Two similar diffraction patterns reinforce the effect produced by the other whereas two different diffraction patterns could operate differently on an incident light beam. Alternatively, a surface relief pattern 204 may be imprinted on the layer of curable material 108 below the refractive index variations as shown in FIG. 15B. Again, this surface relief pattern 204 may be substantially the same as or different from the diffractive pattern 122 formed by the refractive index features 124 within the curable material. As illustrated in FIG. 15C, surface relief patterns 202, 204 may be included on both sides of the refractive index variations 122. Any of the two surface relief patterns 202, 204 and the pattern of index of refraction features 122 can be substantially same or different.

Additional surface relief patterns 202, 204 can be included in layered structures comprising multiple diffractive layers 122, 132 stacked on each other as illustrated in FIGS. 16A-16D. A surface relief pattern 204 that forms an additional diffraction pattern can be formed on the substrate carrier 118 beneath the two layers 122, 132 of refractive index variations. In this manner, three diffraction patterns 204, 122, 132 can be assembled. This number can be increased by including additional layers of refractive index variations; see, e.g., FIG. 9. Although the surface relief pattern 204 is depicted on the substrate 118, it may otherwise be imprinted on the layer of curable material beneath the diffraction features 124 such as shown in FIGS. 15B and 15C. An index matching or other functional layer 130 may be added to the structure 102 and a surface relief pattern 202, 204 may be imprinted thereon (FIG. 16B), on the substrate 118 (FIG. 16C), or on both (FIG. 16D) thereby introducing additional diffracment. Again, any one of these diffraction patterns included in the structure 102 may be substantially the same or different from each other. Stacking a number of diffraction patterns adds significantly to the design possibilities.

Figure 17:
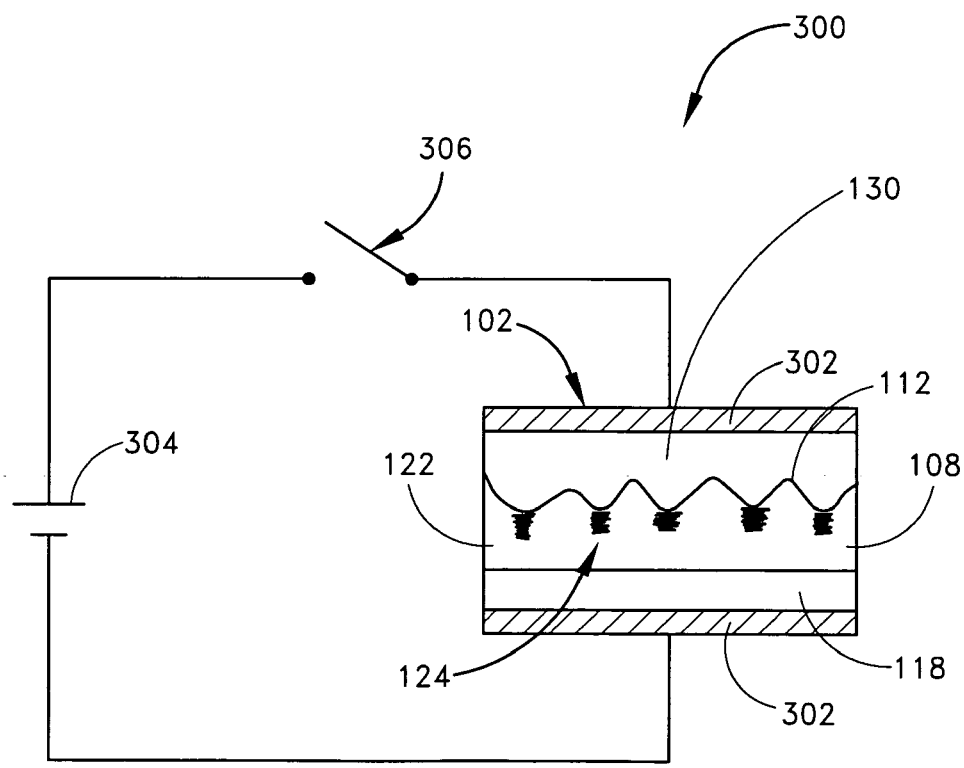
FIG. 17 is a schematic illustration of a switchable diffractive optical element that includes a pair of electrodes electrically connected to a power supply for switching the diffractive optical elements.

As shown in FIG. 17, a switchable diffractive optical element 300 may be constructed and switched by applying an electric field across the liquid crystal layer 108 containing the diffraction features 124 therein. As illustrated, a pair of electrodes 302 can be disposed on opposite sides of the liquid crystal layer 122. These electrodes 302 preferably comprise material substantially optical transmissive to wavelengths of light intended to be diffracted by the structure 300. One possible conductive material that is suitable is indium tin oxide (ITO). The type of electrode 302 and the material used to fabricate them, however, need not be limited to those recited herein. The electrodes 302 are electrically connected to a source of power 304, e.g. a battery or other voltage supply. Switching electronics, not shown, but represented by a single switch 306 may be included in the electrical path between the power supply 304 and one or both of the electrodes 302.

The electrodes 302 surround the layer of cureable material 108 comprising liquid crystal dopant. In one preferred embodiment, one electrode 302 is adjacent the curable material 108 or a carrier substrate 118 on which the curable material is supported. Another electrode 302 is disposed adjacent the index matching layer 130. This index matching material preferably has an index of refraction sufficiently similar to the layer of curable material 108 so as to substantially remove the diffractive effects of the interface 112 between the two layers. In the case where an electrically conducting material having the substantially the same index of refraction as the curable material and that is substantially optically transmissive to the wavelength of light to be diffracted is available, this conducting layer can serve as both the electrode and the index matching layer, i.e., the two layers 130 and 302 can be combined. In other cases, however, separate index matching and electrode layers 130, 302 are preferably employed. As described above, this index matching layer 130 may correspond to the surface relief tool 100 employed to create the surface relief pattern 112 and diffraction features 124 or this index matching layer may be separately formed on the layer of curable material 108 after removal of the surface relief tool. Index matching, however, is advantage to remove the effects of diffraction caused by the surface relief pattern 112 formed by the surface relief tool. Any number of variations such as those described above are considered possible. For example, multiple layers of refractive index variations 122, 132, 142 such as those shown in FIGS. 8 and 9 can be included. As another example, surface relief patterns 202, 204 can be formed above or below the refractive index pattern 122. Variations in the method of producing this device 300 are also envisioned.

The resultant structure 300 can be switched by applying different electric field strengths across the liquid crystal layer 108 to reorient the liquid crystal molecules contained therein. In this manner, diffraction properties of the diffractive optical element 300 can be altered. For example, the strength of the diffraction imparted by the index of refraction variations within the liquid crystal layer 108 can be varied. Also, the diffractive optical element 300 may be switched between different states, e.g., one wherein light is diffracted from the index of refraction variations within the liquid crystal layer 108 and another state where this diffraction is removed. Liquid crystal is responsive to applied electrical fields and can alter its orientation to be aligned or randomly oriented. Application of electric field to the diffraction layer comprising liquid crystal may alter the index of refraction variations and the associated diffraction features. The field strength can be set to either enhance or degrade the diffraction of light by the diffractive features 124. Variations in diffraction strength including outright extinguishing of diffraction otherwise provided by the diffractive features 124 is possible. The diffractive element 300 can therefore be made variable and be switched from one state to another. In one embodiment, the diffraction will be able to be switched on and off with application and removal or other alteration of the applied field.

The switchable diffractive optical element 300 can therefore be employed as an optical switch to alternately transmit or block a beam of light, to switch the direction of an optical beam and to switch between different beams of light having different wavelengths. This device 300 can also provide variable levels of diffraction as desired. The functionalities of this device 300 are not to be considered limited to those recited herein. Various other configuration are considered possible to implement the desired objective.

The embodiments described above include a method of fabricating a diffractive element comprising a pattern of refractive index variations in a manner that virtually eliminates the requirements for stability. The method is substantially immune to vibration, air currents, thermal variations, and stress than conventional techniques for forming such optical elements such as volume holograms. This method can be implemented by hand and outdoors or in other rugged environments. Simple surface relief tooling can be employed and high production rates can be achieved. Yet, in comparison with surface relief elements like surface holograms, these diffractive optical elements offer high wavelength and angular selectivity as well as increased efficiency and throughput. In addition, index matching layers such as layers of substantially the same material as the diffraction layers can be formed on the diffractive features to remove the diffractive effects of surface relief. Further, additional diffractive layers can be formed directly on each other and these layers can also have similar coefficients of expansion and refractive indexes. Metallization or other layers are not needed between the diffractive layers to provide diffraction as diffractive features within each layer may contribute to diffraction. Adhesives are not necessary to bond these different diffractive layers together; the layers preferably comprise substantially the same material which may cause the diffractive layers to fuse together as one. In addition, a variable or switchable diffractive optical element or hologram can be created by applying a field to activate or otherwise act upon the liquid crystal within the diffraction optical element and alter the diffraction properties thereof. Such a switchable or variable diffraction element can be employed in displays (e.g., in computers, cell phones, and personal digital assistants and other hand-held or larger devices) and projection equipment, as well as for switching, multiplexing, etc. in telecommunications and computing. The applications, however, are not limited to these.

Although the foregoing description of the preferred embodiments of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention.

What is claimed is:

1. A non-switchable diffractive optical element, comprising:
    an unelectroded sheet comprised of a cured material having a first set of diffractive features formed by a pattern of refractive index variations, said first set of diffractive features originating at an undulating boundary and extending only from one side of said boundary into said cured material, said undulating boundary having an undulating pattern having peaks and valleys that corresponds to the pattern of refractive index variations,
    wherein said pattern of index variation comprises cured material comprising liquid crystal adjacent said peaks and said valleys, and
    wherein said first set of diffractive features are concentrated towards the undulating boundary.

2. The diffractive optical element of claim 1, wherein said sheet comprises first and second portions that come together at said boundary, said first and second portions on opposite sides of said boundary, at least said first portion comprised of said material, said first set of diffractive features extending from said boundary into said first portion.

3. The diffractive optical element of claim 2, wherein said first and second portions have substantially identical thermal coefficients of expansion.

4. The diffractive optical element of claim 2, wherein said first and second portions have substantially identical indices of refraction such that light is not reflected from said boundary.

5. The diffractive optical element of claim 4, wherein said first and second portions are both comprised of said material.

6. The diffractive optical element of claim 2, wherein said first and second portions are fused together at said boundary.

7. The diffractive optical element of claim 6, wherein said first and second portions are fused together by covalent bonding.

8. The diffractive optical element of claim 2, wherein said first and second portions both comprise substantially optically transmissive material.

9. The diffractive optical element of claim 2, wherein said second portion has a second set of diffractive features formed by a predetermined pattern of refractive index variations.

10. The diffractive optical element of claim 9, wherein said second set of diffractive features in said second portion originate at another undulating boundary and extend from said another boundary into said second portion, said another undulating boundary having an undulating pattern that corresponds to a predetermined pattern of refractive index variations in said second portion, wherein said second set of diffractive features in said second portion are concentrated towards said another undulating boundary.

11. The diffractive optical element of claim 10, wherein the predetermined pattern of refractive index variations in said second portion corresponds to said predetermined pattern of refractive index variations in said second portion.

12. The diffractive optical element of claim 10, further comprising one or more layers containing a predetermined pattern of refractive index variations therein.

13. The diffractive optical element of claim 2, wherein said first and second portions comprise a UV curable polymer.

14. The diffractive optical element of claim 2, wherein said second portion comprises liquid crystal.

15. The diffractive optical element of claim 2, wherein said second portion comprises a non-holographic layer.

16. A diffractive optical element, comprising:
a layer of cured material having a first surface and a second surface opposite said first surface and having diffractive features formed by a pattern of refractive index variations;
a first surface relief pattern having peaks and valleys formed on said first surface of the layer, said surface relief pattern corresponding to said pattern of refractive index variations; and
an additional a second surface relief pattern on said second surface of the layer;
wherein said pattern of refractive index variations comprises cured material comprising an optical liquid beneath said peaks and said valleys,
wherein said diffractive features originate from the first surface of the layer and are more concentrated towards the first surface than the second surface.

17. The diffractive optical element of claim 16, further comprising electrodes surrounding said layer of material having diffractive features for inducing an electric field across said layer of material.

18. The diffractive optical element of claim 17, further comprising:
a coating over one of said surface relief pattern, wherein said coating and said layer have substantially identical indices of refraction; and
a first electrode adjacent said layer of material and a second electrode adjacent said coating thereon for inducing an electric field across said layer of material.

19. The diffractive optical element of claim 18, wherein said coating comprises a non-holographic layer.

20. A diffractive optical element formed by a method comprising:
physically contacting a layer of curable material having a first surface and a second surface opposite the first surface, with a surface relief pattern on a surface of a medium to thereby imprint said pattern on said first surface of said layer;
forming diffractive features in said layer by propagating energy through said medium and from said medium into said layer such that refractive index variations corresponding to said pattern are created in said layer, wherein said diffractive features originate from the first surface of the layer and are more concentrated towards the first surface than the second surface; and
wherein said index variations comprise curable material comprising liquid crystal adjacent said pattern on said layer,
wherein said layer of curable material is disposed on a rollable carrier layer.

21. The diffractive optical element of claim 20, wherein the method of forming further comprises removing said medium from said layer containing diffractive features.

22. The diffractive optical element of claim 20, wherein said diffractive features collectively form a volume hologram.

23. The diffractive optical element of claim 20, wherein said diffractive features collectively form a diffraction grating.

24. The diffractive optical element of claim 20, wherein said diffractive features collectively form a diffuser.

25. The diffractive optical element of claim 20, wherein said curable material comprises liquid crystal and said method further comprises surrounding said curable material with a pair of electrodes for applying an electrical field across said liquid crystal to alter optical characteristics of said curable material.

26. The diffractive optical element of claim 25, wherein the method of forming further comprises providing electrically conductive substantially optically transmissive material to form said electrodes.

27. The diffractive optical element of claim 26, wherein the method of forming further comprises providing indium tin oxide (ITO) to form said electrodes.

28. The diffractive optical element of claim 25, wherein the method of forming further comprises:
removing said medium having a surface relief paffern from said layer of curable material; and
forming an index matching layer against said imprinted paffern on said layer of curable material, said index matching layer comprising material that has an index of refraction substantially identical to that of said curable material.

29. The diffractive optical element of claim 28, wherein said index matching layer is electrically conductive.

30. The diffractive optical element of claim 28, wherein said index matching layer comprises a non-holographic layer.

31. A diffractive optical element comprising:
a sheet comprising substantially optically transmissive cured material and having surface relief patterns comprising peaks and valleys on opposite sides and an index variation within said substantially optically transmissive material, said index variations coinciding with said peaks and said valleys of at least one of said surface relief patterns, said index variations comprising cured material comprising liquid crystal beneath said peaks and said valleys of one of said surface relief patterns,
wherein said index variations are concentrated towards one of said surface relief patterns.

32. The diffractive optical element of claim 31, further comprising a substantially optically transmissive coating formed on said sheet.

33. The diffractive optical element of claim 32, wherein said substantially optically transmissive coating is index matched to said sheet.

34. The diffractive optical element of claim 33, wherein said surface relief patterns on opposite sides of said sheet are substantially identical.

35. The diffractive optical element of claim 31, further comprising electrodes disposed on opposite sides of said sheet to induce an electric field across said sheet upon application of a voltage.

36. A diffractive optical element, comprising:
a rollable sheet comprised of a cured material having diffractive features formed by a pattern of refractive index variations, said diffractive features originating at an undulating boundary and extending only from one side of said boundary into said cured material, said undulating boundary having an undulating pattern having peaks and valleys that corresponds to the pattern of refractive index variations,
wherein said pattern of index variation comprises cured material comprising liquid crystal adjacent said peaks and said valleys, and
wherein said diffractive features are concentrated towards said undulating boundary.

* * * * *

UNITED STATES PATENT AND TRADEMARK OFFICE
CERTIFICATE OF CORRECTION

PATENT NO. : 7,429,437 B2
APPLICATION NO. : 11/343576
DATED : September 30, 2008
INVENTOR(S) : Chris Rich et al.

It is certified that error appears in the above-identified patent and that said Letters Patent is hereby corrected as shown below:

In Column 3 at approximately line 11, change "predetermined-" to --predetermined--.

In Column 4 at line 13, change "AND" to --and--.

In Column 15 at line 21, change "diffaction" to --diffraction--.

In Column 18 at line 13, in Claim 28, change "paffem" to --pattern--.

In Column 18 at line 16, in Claim 28, change "paffem" to --pattern--.

Signed and Sealed this

Fourteenth Day of April, 2009

JOHN DOLL
*Acting Director of the United States Patent and Trademark Office*